US007340555B2

(12) United States Patent
Ashmore et al.

(10) Patent No.: US 7,340,555 B2
(45) Date of Patent: Mar. 4, 2008

(54) RAID SYSTEM FOR PERFORMING EFFICIENT MIRRORED POSTED-WRITE OPERATIONS

(75) Inventors: Paul Andrew Ashmore, Longmont, CO (US); Ian Robert Davies, Longmont, CO (US); Gene Maine, Erie, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 56 days.

(21) Appl. No.: 11/272,340

(22) Filed: Nov. 10, 2005

(65) Prior Publication Data

US 2006/0277347 A1 Dec. 7, 2006

Related U.S. Application Data

(63) Continuation-in-part of application No. 11/178,727, filed on Jul. 11, 2005, now Pat. No. 7,143,227, and a continuation-in-part of application No. 10/946,341, filed on Sep. 21, 2004, now Pat. No. 7,146,448, and a continuation-in-part of application No. 10/368,688, filed on Feb. 18, 2003, now Pat. No. 7,143,227, and a continuation-in-part of application No. 09/967,126, filed on Sep. 28, 2001, now Pat. No. 7,062,591, and a continuation-in-part of application No. 09/967,194, filed on Sep. 28, 2001, which is a continuation-in-part of application No. 09/967,027, filed on Sep. 28, 2001, now Pat. No. 6,839,788.

(60) Provisional application No. 60/554,052, filed on Mar. 17, 2004, provisional application No. 60/645,340, filed on Jan. 20, 2005.

(51) Int. Cl.
*G06F 13/20* (2006.01)

(52) U.S. Cl. ............. 710/313; 711/114; 710/305; 710/306

(58) Field of Classification Search ............ 710/113, 710/305–306, 62; 711/114
See application file for complete search history.

(56) References Cited

U.S. PATENT DOCUMENTS 4,217,486 A   8/1980  Tawfik et al.

(Continued)

FOREIGN PATENT DOCUMENTS

EP    0800138 A    10/1997

(Continued)

OTHER PUBLICATIONS

Budruk et al. "PCI Express System Architecture." Addison Wesley Professional. Sep. 4, 2003.

(Continued)

*Primary Examiner*—Mark H. Rinehart
*Assistant Examiner*—Kim T. Huynh
(74) *Attorney, Agent, or Firm*—E. Alan Davis; James W. Huffman

(57) ABSTRACT

A bus bridge on a primary RAID controller receives user write data from a host and writes the data to its write cache and also broadcasts the data over a high speed link (e.g., PCI-Express) to a secondary RAID controller's bus bridge, which writes the data to its mirroring write cache. However, before writing the data, the second bus bridge automatically invalidates the cache buffers to which the data is to be written, which alleviates the primary controller's CPU from sending a message to the secondary controller's CPU to instruct it to invalidate the cache buffers. The secondary controller CPU programs its bus bridge at boot time with the base address of its mirrored write cache to enable it to detect that the cache buffer needs invalidating in response to the broadcast write, and with the base address of its directory that includes the cache buffer valid bits.

53 Claims, 6 Drawing Sheets

U.S. PATENT DOCUMENTS

| | | | |
|---|---|---|---|
| 4,428,044 | A | 1/1984 | Liron |
| 5,345,565 | A | 9/1994 | Jibbe et al. |
| 5,408,644 | A | 4/1995 | Schneider et al. |
| 5,483,528 | A | 1/1996 | Christensen |
| 5,530,842 | A | 6/1996 | Abraham et al. |
| 5,619,642 | A | 4/1997 | Nielson et al. |
| 5,668,956 | A | 9/1997 | Okazawa et al. |
| 5,680,579 | A | 10/1997 | Young et al. |
| 5,706,283 | A | 1/1998 | Suzuki |
| 5,812,754 | A | 9/1998 | Lui et al. |
| 5,881,254 | A | 3/1999 | Corrigan et al. |
| 6,009,275 | A | 12/1999 | DeKoning et al. |
| 6,038,680 | A | 3/2000 | Olarig |
| 6,058,455 | A * | 5/2000 | Islam et al. ............. 711/114 |
| 6,094,699 | A | 7/2000 | Surugucchi et al. |
| 6,098,140 | A | 8/2000 | Pecone et al. |
| 6,185,652 | B1 | 2/2001 | Shek et al. |
| 6,243,829 | B1 | 6/2001 | Chan |
| 6,272,533 | B1 | 8/2001 | Browne |
| 6,397,293 | B2 | 5/2002 | Shrader et al. |
| 6,421,769 | B1 | 7/2002 | Teitenberg et al. |
| 6,438,603 | B1 | 8/2002 | Ogus |
| 6,470,429 | B1 | 10/2002 | Jones et al. |
| 6,493,795 | B1 | 12/2002 | Arsenault et al. |
| 6,502,157 | B1 | 12/2002 | Batchelor et al. |
| 6,507,581 | B1 | 1/2003 | Sgammato |
| 6,629,179 | B1 | 9/2003 | Bashford |
| 6,718,408 | B2 | 4/2004 | Esterberg et al. |
| 6,732,243 | B2 | 5/2004 | Busser et al. |
| 6,839,788 | B2 | 1/2005 | Pecone |
| 6,912,621 | B2 | 6/2005 | Harris |
| 7,046,668 | B2 | 5/2006 | Pettey et al. |
| 7,069,368 | B2 | 6/2006 | Thornton |
| 7,107,343 | B2 * | 9/2006 | Rinaldis et al. ............. 709/225 |
| 2001/0013076 | A1 | 8/2001 | Yamamoto |
| 2002/0029319 | A1 | 3/2002 | Robbins et al. |
| 2002/0069317 | A1 | 6/2002 | Chow et al. |
| 2002/0069334 | A1 | 6/2002 | Hsia et al. |
| 2002/0083111 | A1 | 6/2002 | Row et al. |
| 2002/0091828 | A1 | 7/2002 | Kitamura et al. |
| 2002/0099881 | A1 | 7/2002 | Gugel |
| 2002/0194412 | A1 | 12/2002 | Bottom |
| 2003/0065733 | A1 | 4/2003 | Pecone |
| 2003/0065836 | A1 * | 4/2003 | Pecone ............. 710/62 |
| 2004/0177126 | A1 | 9/2004 | Maine |
| 2005/0044169 | A1 | 2/2005 | Arbeitman et al. |
| 2005/0102557 | A1 | 5/2005 | Davies et al. |
| 2006/0161707 | A1 | 7/2006 | Davies et al. |
| 2006/0282701 | A1 | 12/2006 | Davies et al. |

FOREIGN PATENT DOCUMENTS

| | | |
|---|---|---|
| EP | 0817054 | 1/1998 |
| EP | 0967552 | 12/1999 |
| GB | 2396726 A | 6/2004 |
| JP | 2001142648 | 5/2001 |
| WO | WO2007002219 | 1/2007 |

OTHER PUBLICATIONS

"DCM PCI-X Verification Services" Datasheet #1. DCM Technologies, 39675 Cedar Blvd., #220, Newark, CA 94560.
"PCI-X Synthesizable Core." inSilicon Corporation. San Jose, CA. 1999.
"IBM 133 PCI-X Bridge" Datasheet. Apr. 6, 2001.
"IBM 133 PCI-X Bridge" Datasheet 2000. IBM Microelectronics Division.
"Tsi320™ Software Initialization Application Note." Oct. 2001. 80A600B_AN002_01. Tundra Semiconductor Corporation.
"PCI-X Bus Test Environment." 1999. inSilicon Corporation 411 East Plumeria Dr. San Jose, CA 95134.
"1005 IDT Precise PCI-Express Family Presentation." Integrated Device Technology.
"COMPAQ Rapid Enabler for PCI-X (CREX) Initiator Interface." (Preliminary). Revision 0.28 Sep. 2, 1999.
"COMPAQ Rapid Enabler for PCI-X (CREX) Target Bus Interface." (Preliminary). Revision 0.36 Sep. 2, 1999.
"Intel 41210 Serial to Parallel PCI Bridge Product Brief." Intel Corporation. 2003.
PERICOM. "Bridge Products Road Map." Customer Presentation. pp. 31, 33-35.
IDT. "24-lane 3-Port PCI Express Switch" Product Brief. 89PES24N3. Dec. 22, 2005. Integrated Device Technology, Inc.
"PEX 8104" Data Book. Version 0.61. Mar. 2004. PLX Technology, Inc.
"PEX 8114 PCI Express to PCI/PCI-X Bridge." Product Brief. Version 2.0. 2004. PLX Technology, Inc.
"Tsi320™ PCI/X-to-PCI/X Bus Bridge Manual." Jan. 2001. 80A600B_MA001_02. Tundra Semiconductor Corporation.
"Tsi320™ Dual-Mode PCI-to-PCI Bus Bridge Errata." Sep. 2001. 80A600B_ER001_05. Tundra Semiconductor Corporation.
"Tsi320™ Dual-Mode PCI-to-PCI Bus Bridge User Manual." Jun. 2001. 80A600B_MA001_04. Tundra Semiconductor Corporation.
"Corex-V10 PCI-X Initiator/Target" Datasheet #1. DCM Technologies, 39675 Cedar Blvd., #220, Newark, CA 94560.
"X-caliber Design Specification: PCI-2.2/PCI-X Megacell" Rev 0.99.3. Nov. 19, 1999.
DCM Presentation. DCM Technologies, 39675 Cedar Blvd. #220, Newark, CA 94560.
"PEX 8114: PCI-X -PCI Express Bridge." Data Book. Version 0.70. May 2004. PLX Technology, Inc.
"Corex-V10 PCI-X Initiator/Target" Datasheet #2. DCM Technologies, 39675 Cedar Blvd., #220, Newark, CA 94560.
"DCM Corex-V10 FAQ." version 1.00. DCM Technologies, 39675 Cedar Blvd., #220, Newark, CA 94560.
IDT. "24-lane 3-Port PCI Express Switch" Data Sheet. 89HPES24N3. Feb. 14, 2006. Integrated Device Technology, Inc.
"DCM PCI-X Verification Services" Datasheet #2. DCM Technologies, 39675 Cedar Blvd., #220, Newark, CA 94560.
IDT. "12-lane 3-Port PCI Express Switch" Data Sheet. 89HPES12N3. Feb. 14, 2006. Integrated Device Technology, Inc.
IDT. "12-lane 3-Port PCI Express Switch" Product Brief. 89PES12N3. Feb. 15, 2006. Integrated Device Technology, Inc.
"Intel 41210 Serial to Parallel PCI Bridge Datasheet." Intel Corporation. Sep. 2003.
"Intel 41210 Serial to Parallel PCI Bridge Design Guide." Intel Corporation. Nov. 2003.
QuickLogic PCI Presentation. "QuickPCI™ Family of Embedded Standard Products (ESPs)."
"QL5064—QuickPCI™" DataSheet, Rev B. Feb. 2, 2000. QuickLogic.
"IDT 89HPES12N3 PCI Express Switch." User Manual Table of Contents & Overview. Integrated Device Technology. Feb. 8, 2006.

"IDT 89HPES24N3 PCI Express Switch." User Manual Table of Contents & Overview. Integrated Device Technology. Feb. 8, 2006.

Young et al. *A high I/O reconfigurable crossbar switch*. 11th Annual IEEE Symposium on Field-Programmable Custom Computing Machines, 2003. FCCM 2003. Apr. 9-11, 2003. pp. 3-10.

Landman et al. *Activity-sensitive architectural power analysis*. IEEE Transactions on Computer-Aided Design of Integrated Circuits and Systems. Jun. 1996. pp. 571-587.

U.S. Office Action for U.S. Appl. No. 09/967,027, filed Apr. 30, 2004, pp. 1-7 and cover sheet.

U.S. Office Action for U.S. Appl. No. 09/967,126, filed Mar. 7, 2005, pp. 1-5 and cover sheet.

European Examination Report for Application No. GB0406742.7, dated Nov. 10, 2004.

European Examination Report for Application No. GB0406739.3, dated Nov. 10, 2004.

European Examination Report for Application No. GB0406740.1, dated Nov. 10, 2004.

LSI Corporation. MegaRAID SAS 8408E. Product Brief. 2007.

"DCM PCI-X Verification Services" Datasheet #1. DCM Technologies, 39675 Cedar Blvd., #220, Newark, CA 94560, unknown date.

"PCI-X Synthesizable Core." inSilicon Corporation. San Jose, CA. 1999.

"IBM 133 PCI-X Bridge" Datasheet. Apr. 6, 2001.

"IBM 133 PCI-X Bridge" Datasheet 2000. IBM Microelectronics Division.

"Tsi320™ Software Initialization Application Note." Oct. 2001. 80A600B_AN002_01. Tundra Semiconductor Corporation.

"PCI-X Bus Test Environment." 1999. inSilicon Corporation 411 East Plumeria Dr. San Jose, CA 95134.

"1005 IDT Precise PCI-Express Family Presentation." Integrated Device Technology, unknown date.

"COMPAQ Rapid Enabler for PCI-X (CREX) Initiator Interface." (Preliminary). Revision 0.28 Sep. 2, 1999.

"COMPAQ Rapid Enabler for PCI-X (CREX) Target Bus Interface." (Preliminary). Revision 0.36 Sep. 2, 1999.

"Intel 41210 Serial to Parallel PCI Bridge Product Brief." Intel Corporation. 2003.

PERICOM. "Bridge Products Road Map." Customer Presentation. pp. 31, 33-35, unknown date.

IDT. "24-lane 3-Port PCI Express Switch" Product Brief. 89PES24N3. Dec. 22, 2005. Integrated Device Technology, Inc.

"PEX 8104" Data Book. Version 0.61. Mar. 2004. PLX Technology, Inc.

"PEX 8114 PCI Express to PCI/PCI-X Bridge." Product Brief. Version 2.0. 2004. PLX Technology, Inc.

"Tsi320™ PCI/X-to-PCI/X Bus Bridge Manual." Jan. 2001. 80A600B_MA001_02. Tundra Semiconductor Corporation.

"Tsi320™ Dual-Mode PCI-to-PCI Bus Bridge Errata." Sep. 2001. 80A600B_ER001_05. Tundra Semiconductor Corporation.

"Tsi320™ Dual-Mode PCI-to-PCI Bus Bridge User Manual." Jun. 2001. 80A600B_MA001_04. Tundra Semiconductor Corporation.

"Corex-V10 PCI-X Initiator/Target" Datasheet #1. DCM Technologies, 39675 Cedar Blvd., #220, Newark, CA 94560, unknown date.

"X-caliber Design Specification: PCI-2.2/PCI-X Megacell" Rev 0.99.3. Nov. 19, 1999.

DCM Presentation. DCM Technologies, 39675 Cedar Blvd. #220, Newark, CA 94560, unknown date.

"PEX 8114: PCI-X -PCI Express Bridge." Data Book. Version 0.70. May 2004. PLX Technology, Inc.

"Corex-V10 PCI-X Initiator/Target" Datasheet #2. DCM Technologies, 39675 Cedar Blvd., #220, Newark, CA 94560, unknown date.

"DCM Corex-V10 FAQ." version 1.00. DCM Technologies, 39675 Cedar Blvd., #220, Newark, CA 94560, unknown date.

IDT. "24-lane 3-Port PCI Express Switch" Data Sheet. 89HPES24N3. Feb. 14, 2006. Integrated Device Technology, Inc.

"DCM PCI-X Verification Services" Datasheet #2. DCM Technologies, 39675 Cedar Blvd., #220, Newark, CA 94560, unknown date.

IDT. "12-lane 3-Port PCI Express Switch" Data Sheet. 89HPES12N3. Feb. 14, 2006. Integrated Device Technology, Inc.

IDT. "12-lane 3-Port PCI Express Switch" Product Brief. 89PES12N3. Feb. 15, 2006. Integrated Device Technology, Inc.

"Intel 41210 Serial to Parallel PCI Bridge Datasheet." Intel Corporation. Sep. 2003.

"Intel 41210 Serial to Parallel PCI Bridge Design Guide." Intel Corporation. Nov. 2003.

QuickLogic PCI Presentation. "QuickPCI™ Family of Embedded Standard Products (ESPs)," unknown date.

"QL5064—QuickPCI™" DataSheet, Rev B. Feb. 2, 2000. QuickLogic.

"IDT 89HPES12N3 PCI Express Switch." User Manual Table of Contents & Overview. Integrated Device Technology. Feb. 8, 2006.

"IDT 89HPES24N3 PCI Express Switch." User Manual Table of Contents & Overview. Integrated Device Technology. Feb. 8, 2006.

* cited by examiner 402 invalidate cache flag

RAID SYSTEM FOR PERFORMING EFFICIENT MIRRORED POSTED-WRITE OPERATIONS

CROSS REFERENCE TO RELATED APPLICATIONS

This application is a continuation-in-part (CIP) of the following co-pending Non-Provisional U.S. Patent Applications, which are hereby incorporated by reference in their entirety for all purposes:

| Ser. No. (Docket No.) | Filing Date | Title |
| --- | --- | --- |
| 10/368,688 (CHAP.0101) | Feb. 18, 2003 | BROADCAST BRIDGE APPARATUS FOR TRANSFERRING DATA TO REDUNDANT MEMORY SUBSYSTEMS IN A STORAGE CONTROLLER |
| 10/946341 (CHAP.0113) | Sep. 21, 2004 | APPARATUS AND METHOD FOR ADOPTING AN ORPHAN I/O PORT IN A REDUNDANT STORAGE CONTROLLER |
| 11/178727 (CHAP.0125) | Jul. 11, 2005 | METHOD FOR EFFICIENT INTER-PROCESSOR COMMUNICATION IN AN ACTIVE-ACTIVE RAID SYSTEM USING PCI-EXPRESS LINKS |

Pending U.S. patent application Ser. No. 10/946341 (CHAP.0113) is a continuation-in-part (CIP) of the following U.S. patent, which is hereby incorporated by reference in its entirety for all purposes:

| U.S. Pat. No. | Issue Date | Title |
| --- | --- | --- |
| 6,839,788 | Jan. 4, 2005 | BUS ZONING IN A CHANNEL INDEPENDENT CONTROLLER ARCHITECTURE |

Pending U.S. patent application Ser. No. 10/946341 (CHAP.0113) is a continuation-in-part (CIP) of the following co-pending Non-Provisional U.S. patent applications, which are hereby incorporated by reference in their entirety for all purposes:

| Ser. No. (Docket No.) | Filing Date | Title |
| --- | --- | --- |
| 09/967,126 (4430-29) | Sep. 28, 2001 | CONTROLLER DATA SHARING USING A MODULAR DMA ARCHITECTURE |
| 09/967,194 (4430-32) | Sep. 28, 2001 | MODULAR ARCHITECTURE FOR NETWORK STORAGE CONTROLLER |
| 10/368,688 (CHAP.0101) | Feb. 18, 2003 | BROADCAST BRIDGE APPARATUS FOR TRANSFERRING DATA TO REDUNDANT MEMORY SUBSYSTEMS IN A STORAGE CONTROLLER |

Pending U.S. patent application Ser. No. 10/946341 (CHAP.01 13) claims the benefit of the following expired U.S. Provisional Application, which is hereby incorporated by reference in its entirety for all purposes:

| Ser. No. (Docket No.) | Filing Date | Title |
| --- | --- | --- |
| 60/554052 (CHAP.0111) | Mar. 17, 2004 | LIBERTY APPLICATION BLADE |

Pending U.S. patent application Ser. No. 11/178,727 (CHAP.0125) claims the benefit of the following pending U.S. Provisional Application, which is hereby incorporated by reference in its entirety for all purposes:

| Ser. No. (Docket No.) | Filing Date | Title |
| --- | --- | --- |
| 60/645,340 (CHAP.0125) | Jan. 20, 2005 | METHOD FOR EFFICIENT INTER-PROCESSOR COMMUNICATION IN AN ACTIVE-ACTIVE RAID SYSTEM USING PCI-EXPRESS LINKS |

FIELD OF THE INVENTION

The present invention relates in general to the field of mirrored posted-write operations in RAID systems, and particularly to the efficient synchronization of write cache directories during such operations.

BACKGROUND OF THE INVENTION

Redundant Array of Inexpensive Disk (RAID) systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical disk drives in such a manner as to present a single logical disk drive (or multiple logical disk drives) to a computer operating system. RAID controllers employ the techniques of data striping and data redundancy to increase performance and data availability.

One technique for providing high data availability in RAID systems is to include redundant fault-tolerant RAID controllers in the system. Providing redundant fault-tolerant RAID controllers means providing two or more controllers such that if one of the controllers fails, one of the other redundant controllers continues to perform the function of the failed controller. For example, some RAID controllers include redundant hot-pluggable field replaceable units (FRUs) such that when a controller fails, an FRU can be quickly replaced in many cases to restore the system to its original data availability level.

An important characteristic of RAID controllers, particularly in certain applications such as transaction processing or real-time data capture of large data streams, is to provide fast write performance. In particular, the overall performance of the computer system may be greatly improved if the write latency of the RAID controller is relatively small. The write latency is the time the RAID controller takes to complete a write request from the computer system.

Many RAID controllers include a relatively large cache memory for caching user data from the disk drives. Caching the data enables the RAID controller to quickly return data to the computer system if the requested data is in the cache memory since the RAID controller does not have to perform the lengthy operation of reading the data from the disk drives. The cache memory may also be employed to reduce write request latency by enabling what is commonly referred to as posted-write operations, or write-caching operations. In a posted-write operation, the RAID controller receives the data specified by the computer system from the computer system into the RAID controller's cache memory and then immediately notifies the computer system that the write request is complete, even though the RAID controller has not yet written the data to the disk drives. Posted-writes are particularly useful in RAID controllers, since in some redundant RAID levels a read-modify-write operation to the disk drives must be performed in order to accomplish the system write request. That is, not only must the specified system data be written to the disk drives, but some of the disk drives may also have to be read before the user data and redundant data can be written to the disks, which, without the benefit of posted-writes, may make the write latency of a RAID controller even longer than a non-RAID controller.

However, posted-write operations make the system vulnerable to data loss in the event of a failure of the RAID controller before the user data has been written to the disk drives. To reduce the likelihood of data loss in the event of a write-caching RAID controller failure in a redundant RAID controller system, the user data is written to both of the RAID controllers so that if one controller fails, the other controller can flush the posted-write data to the disks. Writing the user data to the write cache of both RAID controllers is commonly referred to as a mirrored write operation. If write-posting is enabled, then the operation is a mirrored posted-write operation.

Mirrored posted-write operations require communication between the two controllers to provide synchronization between the write caches of the two controllers to insure the correct user data is written to the disk drives. This cache synchronization communication may be inefficient. In particular, the communication may introduce additional latencies into the mirrored posted-write operation and may consume precious processing bandwidth of the CPUs on the RAID controllers. Therefore what is needed is a more efficient means for performing mirrored posted-write operations in redundant RAID controller systems.

BRIEF SUMMARY OF INVENTION

The present invention provides an efficient mirrored posted-write operation system that employs a bus bridge on the secondary RAID controller to automatically invalidate relevant entries in its write cache buffer directory in response to the broadcasted user data based on the data destination address, prior to the secondary bus bridge writing the data to its write cache buffers, thereby alleviating the need for the primary and secondary CPUs to communicate to invalidate the secondary directory entries.

In one aspect, the present invention provides a method for performing a mirrored posted-write operation in a system having first and second redundant array of inexpensive disks (RAID) controllers in communication via a high-speed communications link. Each of the RAID controllers has a CPU, a write cache, and a bus bridge that bridges the CPU, write cache, and communications link. The method includes the first bus bridge receiving data transmitted to the first RAID controller by a host computer. The method also includes the first bus bridge writing the data to the first write cache, in response to receiving the data. The method also includes the first bus bridge broadcasting a copy of the data to the second bus bridge via the link, in response to receiving the data. The method also includes the second bus bridge writing the copy of the data to one or more cache buffers of the second write cache, in response to the broadcasting. The method also includes the second bus bridge invalidating the one or more cache buffers, in response to the broadcasting, prior to writing the copy of the data. The second bus bridge invalidates the one or more cache buffers, rather than the second CPU invalidating them.

In another aspect, the present invention provides a bus bridge on a first redundant array of inexpensive disks (RAID) controller. The bus bridge includes a memory interface, coupled to a cache memory of the first RAID controller, containing a plurality of write cache buffers and a directory of the write cache buffers. The directory includes valid indicators for indicating whether each of the plurality of write cache buffers contains valid data to be flushed to a disk array by the first RAID controller if a second RAID controller in communication with the first RAID controller fails. The bus bridge also includes a first local bus interface that enables a CPU of the first RAID controller to access the cache memory. The bus bridge also includes a second local bus interface that couples the first RAID controller to the second RAID controller via a second local bus. The second local bus interface receives mirrored write-cache data broadcasted from the second RAID controller on the local bus. The memory interface writes the mirrored write-cache data to one of the write cache buffers, and updates the valid indicators to indicate the write cache buffer does not contain valid data prior to writing the mirrored write-cache data. The memory interface writes the mirrored write-cache data and updates the valid indicators in response to receiving said mirrored write-cache data. The CPU is alleviated from updating the valid indicators because the memory interface updates the valid indicators.

In another aspect, the present invention provides a system for performing a mirrored posted-write operation. The system includes two redundant array of inexpensive disks (RAID) controllers in communication via a communications link. Each of the RAID controllers includes a CPU, a write cache, and a bus bridge coupled to the CPU, the write cache, and the communications link. Each bus bridge receives data transmitted to its respective RAID controller by a host computer and, in response, writes the data to its respective write cache and broadcasts a copy of the data to the other bus bridge via the link. The other bus bridge, in response to receiving the copy of the data from the link, writes the copy of the data to a cache buffer of its respective write cache, and invalidates the cache buffer prior to writing the copy of the data. Each of the respective CPUs is alleviated from invalidating the cache buffer.

DETAILED DESCRIPTION

Figure 1:
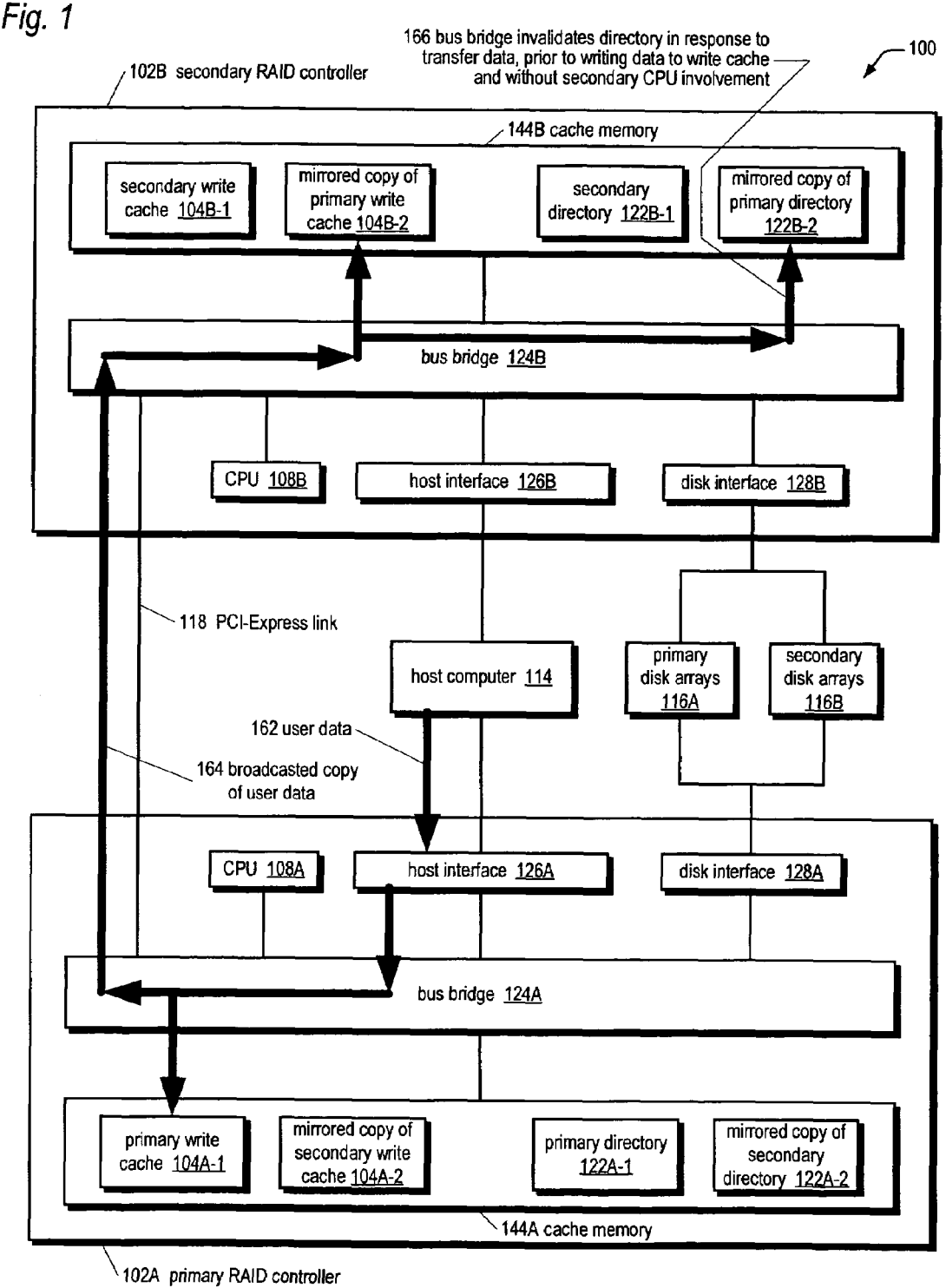
FIG. 1 is a block diagram illustrating an active-active redundant fault-tolerant RAID system according to the present invention.

Referring now to FIG. 1, a block diagram illustrating an active-active redundant fault-tolerant RAID system 100 according to the present invention is shown. The system 100 includes two RAID controllers denoted individually primary RAID controller 102A and secondary RAID controller 102B, generically as RAID controller 102, and collectively as RAID controllers 102. Although the RAID controllers 102 are referred to as primary and secondary, they are symmetric from the perspective that either controller 102 may be failed over to if the other controller 102 fails. The RAID controllers 102 are coupled to one another by a PCI-Express link 118. In one embodiment, the PCI-Express link 118 comprises signal traces on a backplane or mid-plane of a chassis into which the RAID controllers 102 plug. In one embodiment, the RAID controllers 102 are hot-pluggable into the backplane.

The PCI-Express link 118 is an efficient high-speed serial link designed to transfer data between components within a computer system as described in the PCI Express Base Specification Revision 1.0a, Apr. 15, 2003. The PCI Express specification is managed and disseminated through the PCI Special Interest Group (SIG) found at www.pcisig.com. PCI-Express is a serial architecture that replaces the parallel bus implementations of the PCI and PCI-X bus specification to provide platforms with greater performance, while using a much lower pin count. A complete discussion of PCI Express is beyond the scope of this specification, but a thorough background and description can be found in the following books which are incorporated herein by reference for all purposes: *Introduction to PCI Express, A Hardware and Software Developer's Guide*, by Adam Wilen, Justin Schade, Ron Thornburg; *The Complete PCI Express Reference, Design Insights for Hardware and Software Developers*, by Edward Solari and Brad Congdon; and *PCI Express System Architecture*, by Ravi Budruk, Don Anderson, Tom Shanley; all of which are available at www.amazon.com.

Each of the RAID controllers 102 of FIG. 1 are identical and will be described generically; however, each element in FIG. 1 includes an A or B suffix on its reference numeral to indicate the element is part of the primary RAID controller 102A or the secondary RAID controller 102B, respectively.

Each RAID controller includes a CPU 108, or processor 108, or processor complex 108. The processor 108 may be any processor capable of executing stored programs, including but not limited to, for example, a processor and chipset, such as an x86 architecture processor and what are commonly referred to as a North Bridge or Memory Control Hub (MCH) and a South Bridge or I/O Control Hub (ICH), which includes I/O bus interfaces, such as an interface to an ISA bus or a PCI-family bus. In one embodiment, the processor complex 108 comprises a Transmeta TM8800 processor that includes an integrated North Bridge and an ALi M1563S South Bridge. In another embodiment, the processor 108 comprises an AMD Elan SC-520 microcontroller. In another embodiment, the processor 108 comprises an Intel Celeron M processor and an MCH and ICH. In one embodiment, coupled to the processor 108 is random access memory (RAM) from which the processor 108 executes stored programs. In one embodiment, the code RAM comprises a double-data-rate (DDR) RAM, and the processor 108 is coupled to the DDR RAM via a DDR bus.

A disk interface 128 interfaces the RAID controller 102 to disk drives or other mass storage devices, including but not limited to, tape drives, solid-state disks (SSD), and optical storage devices, such as CDROM or DVD drives. In the embodiment shown in FIG. 1, the disk interface 128 of each of the RAID controllers 102 is coupled to two sets of one or more disk arrays 116, denoted primary disk arrays 116A and secondary disk arrays 116B. The disk arrays 116 store user data. The disk interface 128 may include, but is not limited to, the following interfaces: Fibre Channel, Small Computer Systems Interface (SCSI), Advanced Technology Attachment (ATA), Serial Attached SCSI (SAS), Serial Advanced Technology Attachment (SATA), Ethernet, Infiniband, HIPPI, ESCON, iSCSI, or FICON. The RAID controller 102 reads and writes data from or to the disk drives in response to I/O requests received from host computers such as host computer 114 of FIG. 1 which is coupled to the host interface 126 of each of the RAID controllers 102.

A host interface 126 interfaces the RAID controller 102 with host computers 114. In one embodiment, the RAID controller 102 is a local bus-based controller, such as a controller that plugs into, or is integrated into, a local I/O bus of the host computer system 114, such as a PCI, PCI-X, CompactPCI, PCI-Express, PCI-X2, EISA, VESA, VME, RapidIO, AGP, ISA, 3GIO, HyperTransport, Futurebus, MultiBus, or any other local bus. In this type of embodiment, the host interface 126 comprises a local bus interface of the local bus type. In another embodiment, the RAID controller 102 is a standalone controller in a separate enclosure from the host computers 114 that issue I/O requests to the RAID controller 102. For example, the RAID controller 102 may be part of a storage area network (SAN). In this type of embodiment, the host interface 126 may comprise various interfaces such as Fibre Channel, Ethernet, Infini-Band, SCSI, HIPPI, Token Ring, Arcnet, FDDI, LocalTalk, ESCON, FICON, ATM, SAS, SATA, iSCSI, and the like.

A bus bridge 124, is coupled to the processor 108. In one embodiment, the processor 108 and bus bridge 124 are coupled by a local bus, such as a PCI, PCI-X, PCI-Express or other PCI family local bus. Also coupled to the bus bridge 124 are a cache memory 144, the host interface 126, and the disk interface 128. In one embodiment, the cache memory 144 comprises a DDR RAM coupled to the bus bridge 124 via a DDR bus. In one embodiment, the host interface 126 and disk interface 128 comprise PCI-X or PCI-Express devices coupled to the bus bridge 124 via respective PCI-X or PCI-Express buses.

The cache memory 144 is used to buffer messages and data received from the other RAID controller 102 via the PCI-Express link 118. In particular, the software executing on the processor 108 allocates a portion of the cache memory 144 to a plurality of message buffers. The communication of messages between the RAID controllers 102 is described in detail in the above-referenced U.S. patent application Ser. No. 11/178,727 (CHAP.0125).

In addition, the cache memory 144 is used to buffer, or cache, user data as it is transferred between the host computers and the disk drives via the host interface 126 and disk interface 128, respectively. A portion of the cache memory 144 is used as a write cache 104A/B-1 for holding posted write data until the RAID controller 102 writes, or flushes, the data to the disk arrays 116. Another portion of the cache memory 144 is used as a mirrored copy of the write cache 104A/B-2 on the other RAID controller 102. FIG. 1 illustrates a primary write cache 104A-1 in the primary RAID controller 102A cache memory 144, a secondary write cache 104B-1 in the secondary RAID controller 102B cache memory 144, a mirrored copy of the secondary write cache 104A-2 in the primary RAID controller 102A cache memory 144, and a mirrored copy of the primary write cache 104B-2 in the secondary RAID controller 102B cache memory 144. A portion of the cache memory 144 is also used as a directory 122A/B-1 of entries 602 (described below with respect to FIG. 6) for holding information about the state of each write cache buffer 604 (described below with respect to FIG. 6) in the write cache 104A/B-1, such as the disk array 116 logical block addresses (LBAs) and serial numbers, and valid bits associated with each write cache buffer 604. Another portion of the cache memory 144 is used as a mirrored copy of the directory 122A/B-2 on the other RAID controller 102. FIG. 1 illustrates a primary directory 122A-1 in the primary RAID controller 102A cache memory 144, a secondary directory 122B-2 in the secondary RAID controller 102B cache memory 144, a mirrored copy of the secondary directory 122A-2 in the primary RAID controller 102A cache memory 144, and a mirrored copy of the primary directory 122B-2 in the secondary RAID controller 102B cache memory 144. The layout and use of the cache memory 144, and in particular the write caches 104 and directories 122, is described in more detail below with respect to FIGS. 5 through 8 below.

The processor 108, host interface 126, and disk interface 128, read and write data from and to the cache memory 144 via the bus bridge 124. The processor 108 executes programs that control the transfer of data between the disk arrays 116 and the host 114. The processor 108 receives commands from the host 114 to transfer data to or from the disk arrays 116. In response, the processor 108 issues commands to the disk interface 128 to accomplish data transfers with the disk arrays 116. Additionally, the processor 108 provides command completions to the host 114 via the host interface 126. The processor 108 also performs storage controller functions such as RAID control, logical block translation, buffer management, and data caching.

In the embodiment shown in FIG. 1, the disk interface 128 of each of the RAID controllers 102 is coupled to two sets of one or more disk arrays 116, denoted primary disk arrays 116A and secondary disk arrays 116B. Normally, the primary RAID controller 102A controls the primary disk arrays 116A, and the secondary RAID controller 102B controls the secondary disk arrays 116B. However, in the event of a failure of the primary RAID controller 102A, the system 100 fails over to the secondary RAID controller 102B to control the primary disk arrays 116A; conversely, in the event of a failure of the secondary RAID controller 102B, the system 100 fails over to the primary RAID controller 102A to control the secondary disk arrays 116B. In particular, during normal operation, when a host computer 114 sends an I/O request to the primary RAID controller 102A to write data to the primary disk arrays 116A, the primary RAID controller 102A also broadcasts a copy of the user data to the secondary RAID controller 102B for storage in a cache memory 114B of the secondary RAID controller 102B so that if the primary RAID controller 102A fails before it flushes the user data out to the primary disk arrays 116A, the secondary RAID controller 102B can subsequently flush the user data out to the primary disk arrays 116A. Conversely, when a host computer 114 sends an I/O request to the secondary RAID controller 102B to write data to the secondary disk arrays 116B, the secondary RAID controller 102B also broadcasts a copy of the user data to the primary RAID controller 102A for storage in a cache memory 114A of the primary RAID controller 102A so that if the secondary RAID controller 102B fails before it flushes the user data out to the secondary disk arrays 116B, the primary RAID controller 102A can subsequently flush the user data out to the secondary disk arrays 116B.

Before describing how the RAID controllers 102 communicate to maintain synchronization of their write caches 104 and directories 122, an understanding of another possible synchronization method is useful. As stated above, in a mirrored posted-write operation, the user data is written to the write cache of both RAID controllers. This may be accomplished by various means. One is simply to have the host computer write the data to each of the RAID controllers. However, this may be a relatively inefficient, low performance solution. An alternative is for the host computer to write the data to only one of the RAID controllers, and then have the receiving RAID controller write, or broadcast, a copy of the data to the other RAID controller. The above-referenced U.S. patent application Ser. No. 10/368,688 (CHAP.0101) describes such as system that efficiently performs a broadcast data transfer to a redundant RAID controller. However, application Ser. No. 10/368,688 does not describe in detail how the two RAID controllers communicate to maintain synchronization between the two write caches.

One method of maintaining write cache synchronization that could be employed in the broadcasting mirrored posted-write system 100 of FIG. 1 is as follows. Broadly speaking, a three-step process could be employed to keep the mirrored copy of the primary directory 122B-2 synchronized with the primary directory 122A-1 when the primary RAID controller 102A receives an I/O write request from the host computer 114. The first step is for the primary CPU 108A to allocate the necessary write cache buffers 604 in the primary write cache 104A-1, invalidate them in the primary directory 122A-1, and send a message to the secondary CPU 108B instructing it to invalidate the corresponding mirrored copy of the primary write cache 104B-2 write cache buffers 604 in the mirrored copy of the primary directory 122B-2. The primary CPU 108A may send the message via the messaging system described in the above-referenced U.S. patent application Ser. No. 11/178,727 (CHAP.0125). In more conventional systems without a PCI-Express link 118 to enable communication between the primary CPU 108A and secondary CPU 108B, the primary CPU 108A sends the message via other communications links, such as SCSI or FibreChannel. Employing the PCI-Express link 118 in the system 100 has the following advantages over conventional RAID systems: higher bandwidth, lower latency, lower cost, built-in error recovery and multiple retry mechanisms, and greater immunity to service interruptions since the link is dedicated for inter-processor communication rather than being shared with other functions such as storage device I/O, as discussed in the above-referenced U.S. patent application.

Once the secondary CPU 108B informs the primary CPU 108A that it performed the invalidation, the primary CPU 108A performs the second step of programming the primary host interface 126A to transfer the user data from the host computer 114 to the primary write cache 104A-1 via the primary bus bridge 124A. The primary bus bridge 124A in response writes the user data into the primary write cache 104A-1 and broadcasts a copy of the user data to the secondary RAID controller 102B, which writes the user data into the mirrored copy of the primary write cache 104B-2.

Once the primary host interface 126A informs the primary CPU 108A that the user data has been written, the primary CPU 108A performs the third step of sending a message to the secondary CPU 108B instructing it to update the mirrored copy of the primary directory 122B-2 with the destination primary disk array 116A serial number and logical block address and to validate in the mirrored copy of the primary directory 122B-2 the write cache buffers 604 written in the second step. Once the secondary CPU 108B informs the primary CPU 108A that it performed the validation, the primary CPU 108A informs the host computer 114 that the I/O write request is successfully completed.

It is imperative that the first step of invalidating the directories 122 must be performed prior to writing the user data into the destination write cache buffers 604; otherwise, data corruption may occur. For example, assume the user data was written before the invalidation step, i.e., while the directory 122 still indicated the destination write cache buffers 604 were valid, and the primary RAID controller 102A failed before all the data was broadcasted to the mirrored copy of the primary write cache 104B-2. When the system 100 fails over to the secondary RAID controller 102B, the secondary RAID controller 102B would detect that the write cache buffers 604 were valid and flush the partial data to the appropriate primary disk array 116A, causing data corruption.

As may be observed from the foregoing, the three-step process has the disadvantage of being inefficient, particularly because it consumes a relatively large amount of the primary CPU 108A and secondary CPU 108B bandwidth in exchanging the messages, which may reduce the performance of the system 100, such as reducing the maximum number of mirrored posted-write operations per second that may be performed. Additionally, it adds latency to the mirrored posted-write operation since, for example, the primary CPU 108A must wait to program the primary host interface 126A to fetch the user data from the host computer 114 until the secondary CPU 108B performs the invalidation and acknowledges it to the primary CPU 108A, which may also reduce the performance of the system 100, such as reducing the maximum number of mirrored posted-write operations per second that may be performed.

To solve this problem, the embodiments of the system 100 of the present invention described herein advantageously effectively combine the first and second steps; broadly, the secondary bus bridge writes the broadcasted copy of the user data to the mirrored copy of the primary write cache 104B-2, but beforehand, advantageously, automatically invalidates the destination write cache buffers 604 in the mirrored copy of the primary directory 122B-2, thereby alleviating the secondary CPU 108B from having to perform the invalidate step, as described in detail below.

FIG. 1 illustrates, via the thick black arrows, the data flow of a mirrored posted-write operation according to the present invention, which is described in more detail below with respect to FIGS. 7 and 8. The host computer 114 transmits user data 162 to the primary host interface 126A. The primary host interface 126A transmits the user data 162 to the primary bus bridge 124A. The primary bus bridge 124A writes the user data 162 to the primary write cache 104A-1. In addition, the primary bus bridge 124A broadcasts a copy of the user data 164 to the secondary bus bridge 124B via the PCI-Express link 118. The secondary bus bridge 124B writes the copy of the user data 164 to the mirrored copy of the primary write cache 104B-2 on the secondary RAID controller 102B. However, prior to writing the copy of the user data 164 to the mirrored copy of the primary write cache 104B-2, the secondary bus bridge 124B writes to the mirrored copy of the primary directory 122B-2 to invalidate the entry in the mirrored copy of the primary directory 122B-2 associated with the write cache buffers 604 written in the mirrored copy of the primary write cache 104B-2 as indicated in FIG. 1 by arrow 166. Advantageously, the secondary bus bridge 124 automatically invalidates the write cache buffers 604 implicated by the write of the copy of the user data 164 and does so independent of the secondary CPU 108B and primary CPU 108A, thereby effectively eliminating the disadvantages described above in the three-step process.

Figure 2:
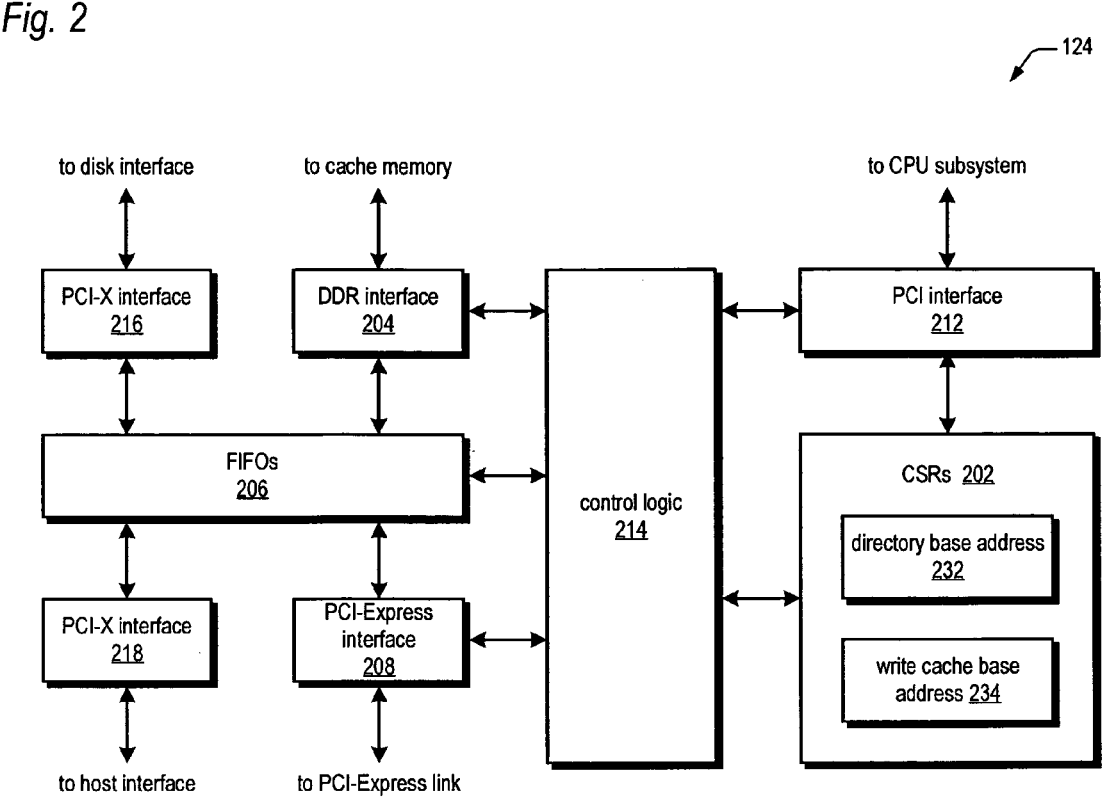
FIG. 2 is a block diagram illustrating in more detail the bus bridge of FIG. 1 according to the present invention.

Referring now to FIG. 2, a block diagram illustrating in more detail the bus bridge 124 of FIG. 1 according to the present invention is shown. The bus bridge 124 includes control logic 214 for controlling various portions of the bus bridge 124. In one embodiment, the control logic 214 includes a direct memory access controller (DMAC) that is programmable by the CPU 108 to perform a direct memory data transfer from one location in the cache memory 144 to a second location in the cache memory 144. Additionally, the CPU 108 may program the DMAC to perform a direct memory data transfer from one location in the primary RAID controller 102A cache memory 144 to a location in the secondary RAID controller 102B cache memory 144, and vice versa, via the PCI-Express link 118, which is useful, among other things, for communicating messages between the CPUs 108 of the two RAID controllers 102, as described in the above-referenced U.S. patent application Ser. No. 11/178,727 (CHAP.0125). In one embodiment, the DMAC is capable of transferring a series of physically discontiguous data chunks whose memory locations are specified by a scatter/gather list whose base address the processor 108 programs into an address register. In this embodiment, the DMAC uses the scatter/gather list address/length pairs to transmit multiple PCI-Express memory write request transaction layer packets (TLPs) including data chunks over the PCI-Express link 118 to the cache memory 144 of the other RAID controller 102.

The bus bridge 124 also includes a local bus interface 216 (such as a PCI-X interface) for interfacing the bus bridge 124 to the disk interface 128; another local bus interface 218 (such as a PCI-X interface) for interfacing the bus bridge 124 to the host interface 126; a memory bus interface 204 (such as a DDR SDRAM interface) for interfacing the bus bridge 124 to the cache memory 144; and a PCI-Express interface 208 for interfacing the bus bridge 124 to the PCI-Express link 118. The local bus interfaces 216 and 218, memory bus interface 204, and PCI-Express interface 208 are all coupled to the control logic 214 and are also coupled to buffers 206 (such as first-in-first-out (FIFO) buffers) that buffer data transfers between the various interfaces and provide parallel high-speed data paths therebetween. The bus bridge 124 also includes a local bus interface 212, such as a PCI interface, coupled to the control logic 214, for interfacing the bus bridge 124 to the CPU 108. The CPU 108 accesses the cache memory 144, disk interface 128, and host interface 126 via the PCI interface 212.

The PCI-Express interface 208 performs the PCI-Express protocol on the PCI-Express link 118, including transmitting and receiving PCI-Express packets, such as PCI-Express TLPs and data link layer packets (DLLPs), and in particular memory write request TLPs, as described in more detail below with respect to FIGS. 3 and 4. In one embodiment, with the exception of the invalidate cache flag 402 and related functional modifications described herein, the PCI-Express interface 208 substantially conforms to the PCI Express Base Specification Revision 1.0a, Apr. 15, 2003.

Figure 6:
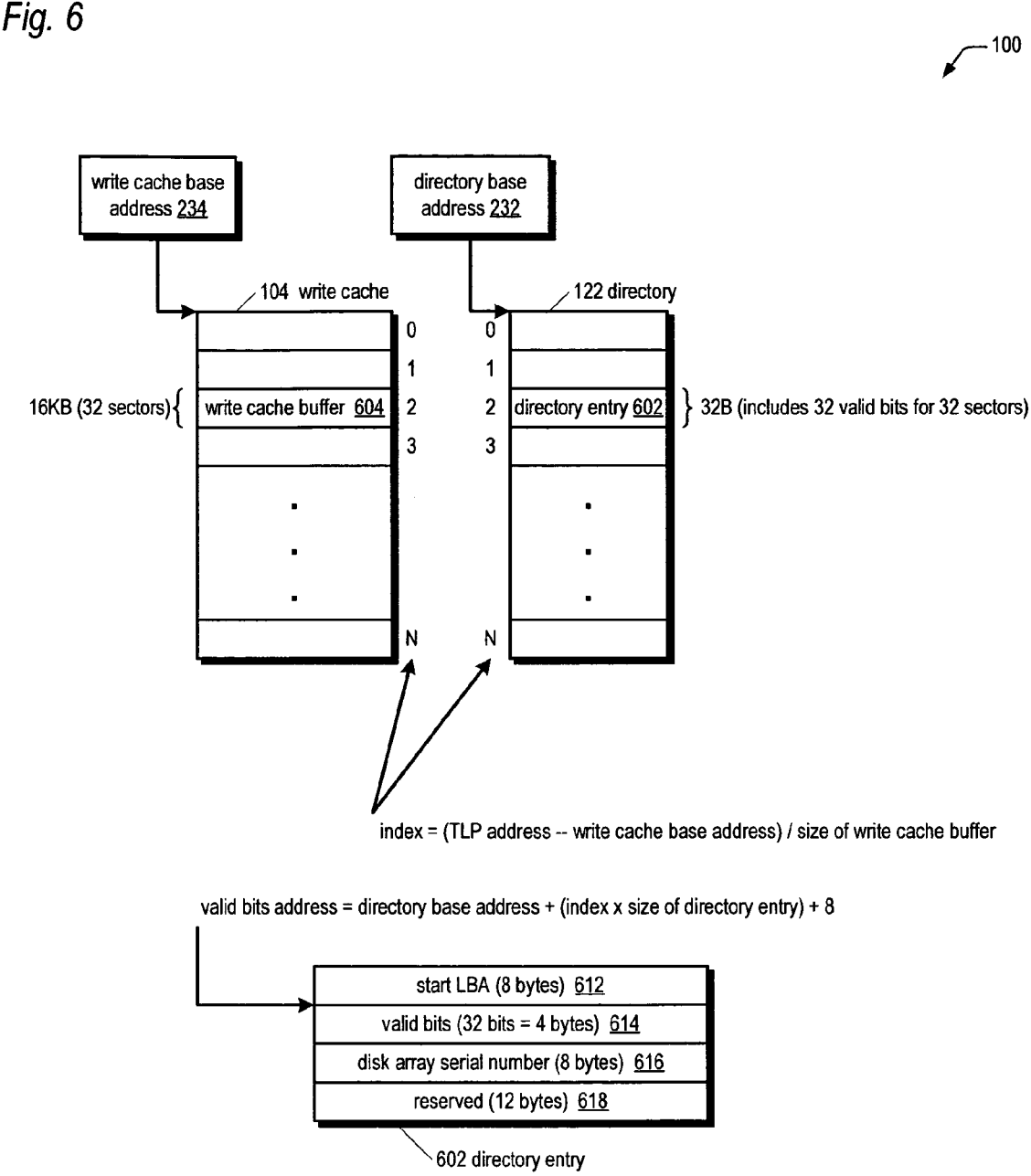
FIG. 6 is a block diagram illustrating the configuration of a write cache and directory of FIG. 1 according to the present invention.

The bus bridge 124 also includes control and status registers (CSRs) 202, coupled to the local bus interface 212 and to the control logic 214. The CSRs 202 are programmable by the CPU 108 of FIG. 1 to control the bus bridge 124 and are readable by the CPU 108 for the bus bridge 124 to provide status to the CPU 108. The CSRs 202 include a write cache base address register 234 and a directory base address register 232. As shown in FIG. 6, the write cache 104 is organized as an array of write cache buffers 604, and the directory 122 is organized as an array of directory entries 602. The write cache base address register 234 stores the memory address of the beginning of the array of write cache buffers 604, and the directory base address register 232 stores the memory address of the beginning of the array of directory entries 602.

Figure 3:
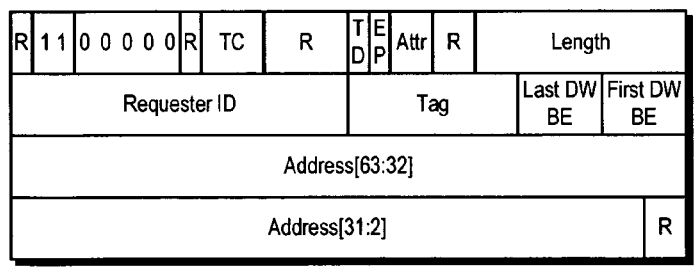
FIG. 3 is a block diagram illustrating a prior art PCI-Express memory write request transaction layer packet (TLP) header.

Referring now to FIG. 3, a block diagram illustrating a prior art PCI-Express memory write request transaction layer packet (TLP) header 300 is shown. The packet header 300 of FIG. 3 illustrates a standard four double word header with data format memory write request TLP header as specified by the current PCI Express Base Specification Revision 1.0a, Apr. 15, 2003. The header 300 includes four 32-bit double words. The first double word includes, from left to right: a reserved bit (R); a Boolean 11 value in the Format field denoting that the TLP header is four double word header with data format TLP; a Boolean 00000 value in the Type field to denote that the TLP includes a memory request and address routing is to be used; a reserved bit (R); a 3-bit Transaction Class (TC) field; four reserved bits (R); a TLP Digest bit (TD); a poisoned data (EP) bit; two Attribute (Attr) bits; two reserved bits (R); and ten Length bits specifying the length of the data payload. The second double word includes, from left to right: a 16 bit Requester ID field; a Tag field; a Last double word byte enable (DW BE) field; and a First double word byte enable (DW BE) field. The third double word includes a 32-bit Address field which specifies bits 63:32 of the destination memory address of the data payload. The fourth double word includes a 30-bit Address field which specifies bits 31:2 of the destination memory address of the data payload, followed by two reserved (R) bits.

Figure 4:
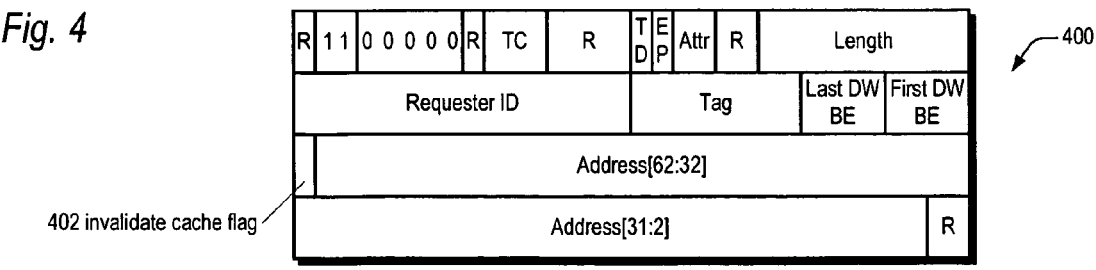
FIG. 4 is a block diagram illustrating a modified PCI-Express memory write request transaction layer packet (TLP) header according to the present invention.

Referring now to FIG. 4, a block diagram illustrating a modified PCI-Express memory write request transaction layer packet (TLP) header 400 according to the present invention is shown. The modified TLP packet header 400 is similar to the standard TLP packet header 300 of FIG. 3; however, the modified TLP packet header 400 includes an invalidate cache flag 402 that occupies bit 63 of the Address field. The Address field bit occupied by the invalidate cache flag 402 is not interpreted by the bus bridge 124 as part of the Address field. Rather, the Address field is shortened relative to the standard PCI-Express TLP header 300 of FIG. 3. Thus, the modified TLP packet header 400 of FIG. 4 reduces the memory address space that may be accessed by the RAID controllers 102 in the other RAID controller 102 in exchange for the capability to transfer mirrored data and invalidate write cache buffers 604 using a TLP without involvement by the processor 108 of the RAID controllers 102. A set invalidate cache flag 402 instructs the bus bridge 124 to invalidate the write cache buffer 604 implicated by the address specified in the Address field prior to writing the data payload of the TLP to the cache memory 144. Although FIG. 4 illustrates using a particular bit of the Address field for the invalidate cache flag 402, the invention is not limited to the particular bit; rather, other bits may be used.

Figure 5:
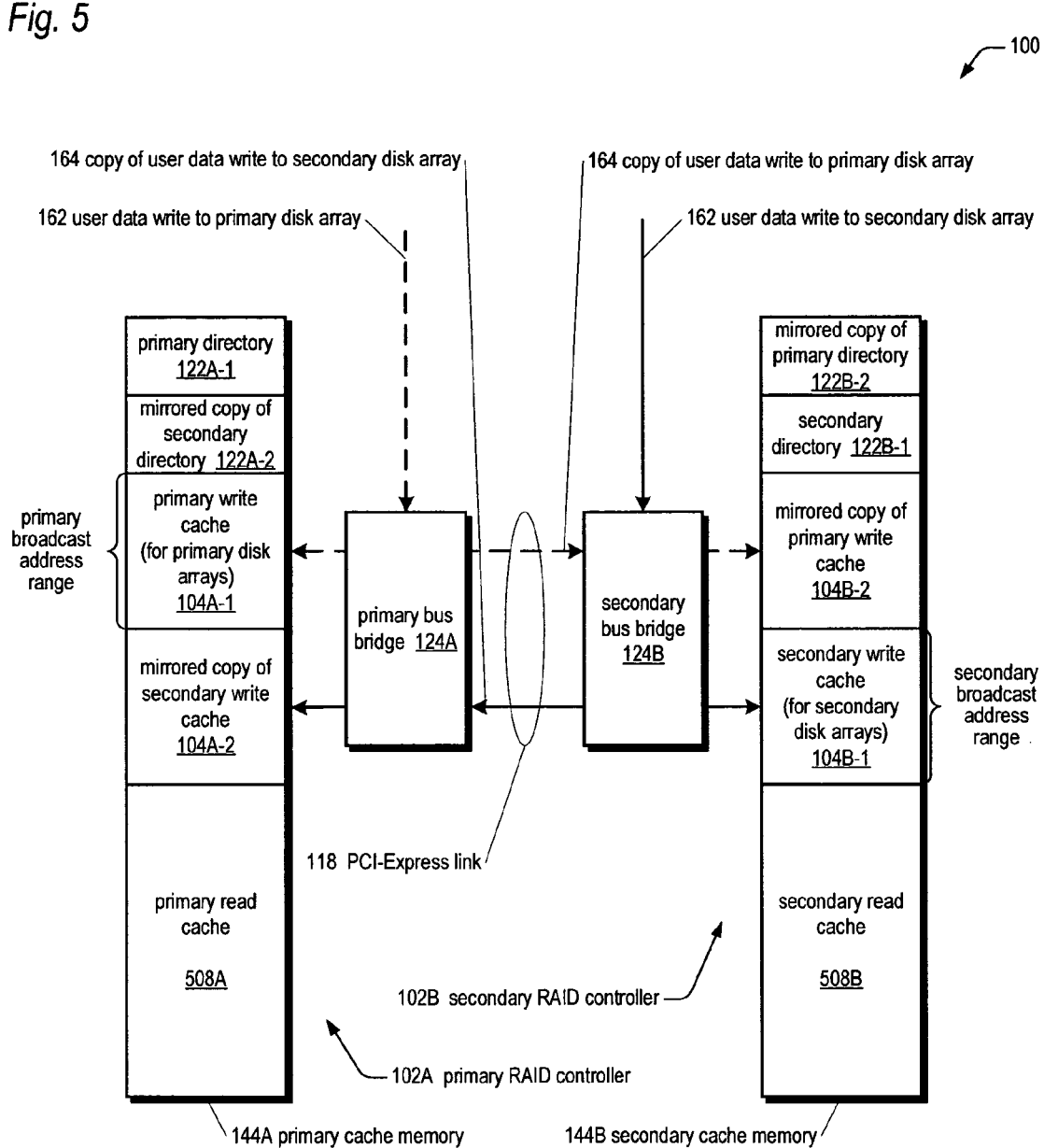
FIG. 5 is a block diagram illustrating the configuration of mirrored cache memories in the two RAID controllers of the system of FIG. 1 according to the present invention.

Referring now to FIG. 5, a block diagram illustrating the configuration of mirrored cache memories 144 in the two RAID controllers 102 of the system 100 of FIG. 1 according to the present invention is shown. FIG. 5 illustrates the primary cache memory 144A coupled to the primary bus bridge 124A, and the secondary cache memory 144B coupled to the secondary bus bridge 124B, and the primary and secondary bus bridges 124 coupled via the PCI-Express link 118, all of FIG. 1.

The primary cache memory 144A includes the primary directory 122A-1, the mirrored copy of the secondary directory 122A-2, the primary write cache 104A-1, and the mirrored copy of the secondary write cache 104A-2, of FIG. 1. The primary cache memory 144A also includes a primary read cache 508A. The primary read cache 508A is used to cache data that has been read from the disk arrays 116 in order to quickly provide the cached data to a host computer 114 when requested thereby without having to access the disk arrays 116 to obtain the data. The secondary cache memory 144B includes the mirrored copy of the primary directory 122B-2, the secondary directory 122B-1, the mirrored copy of the primary write cache 104B-2, and the secondary write cache 104B-1, of FIG. 1. The secondary cache memory 144B also includes a secondary read cache 508B. The secondary read cache 508B is used to cache data that has been read from the disk arrays 116 in order to quickly provide the cached data to a host computer 114 when requested thereby without having to access the disk arrays 116 to obtain the data.

The write caches 104 are used to buffer data received by the RAID controller 102 from a host computer 114 until the RAID controller 102 writes the data to the disk arrays 116. In particular, during a posted-write operation, once the host computer 114 data has been written to write cache buffers 604 of the write cache 104, the RAID controller 102 sends good completion status to the host computer 114 to indicate that the data has been successfully written.

The primary write cache 104A-1 is used by the primary RAID controller 102A for buffering data to be written to the primary disk arrays 116A and the secondary write cache 104B-1 is used by the secondary RAID controller 102B for buffering data to be written to the secondary disk arrays 116B. As mentioned above, during normal operation (i.e., when both the primary and secondary RAID controllers 102 are operating properly such that there has been no failover to the other RAID controller 102), the primary RAID controller 102A controls the primary disk arrays 116A, and the secondary RAID controller 102B controls the secondary disk arrays 116B. Thus, during normal operation, the primary RAID controller 102A only receives I/O requests to access the primary disk arrays 116A from the host computer 114, and the secondary RAID controller 102B only receives I/O requests to access the secondary disk arrays 116B from the host computer 114. As shown in FIG. 5, user data 162 received by the primary bus bridge 124A destined for a primary disk array 116A is written into the primary write cache 104A-1, and user data 162 received by the secondary bus bridge 124B destined for a secondary disk array 116B is written into the secondary write cache 104B-1.

Additionally, the primary write cache 104A-1 is within an address range designated as a primary broadcast address range. If the primary bus bridge 124A receives a transaction from the primary host interface 126A specifying an address within the primary broadcast address range, the primary bus bridge 124A not only writes the user data 162 to the primary write cache 104A-1, but also broadcasts a copy of the user data 164 to the secondary bus bridge 124B via the PCI-Express link 118. In response, the secondary bus bridge 124B writes the copy of the user data 164 to the mirrored copy of the primary write cache 104B-2. Consequently, if the primary RAID controller 102A fails, the copy of the user data 164 is available in the mirrored copy of the primary write cache 104B-2 so that the secondary RAID controller 102B can be failed over to and subsequently flush the copy of the user data 164 out to the appropriate primary disk array 116A. Conversely, the secondary write cache 104B-1 is within an address range designated as a secondary broadcast address range. If the secondary bus bridge 124B receives a transaction from the secondary host interface 126B specifying an address within the secondary broadcast address range, the secondary bus bridge 124B not only writes the user data 162 to the secondary write cache 104B-1, but also broadcasts a copy of the user data 164 to the primary bus bridge 124A via the PCI-Express link 118. In response, the primary bus bridge 124A writes the copy of the user data 164 to the mirrored copy of the secondary write cache 104A-2. Consequently, if the secondary RAID controller 102B fails, the copy of the user data 164 is available in the mirrored copy of the secondary write cache 104A-2 so that the primary RAID controller 102A can be failed over to and subsequently flush the copy of the user data 164 out to the appropriate secondary disk array 116B. In one embodiment, the bus bridges 124 include control registers in the CSRs 202 that specify the broadcast address range. The CPU 108 may program the broadcast address range into the control registers at RAID controller 102 initialization time. In one embodiment, the RAID controllers 102 communicate at initialization time to exchange their broadcast address range values to facilitate mirroring of the write caches 104.

Referring now to FIG. 6, a block diagram illustrating the configuration of a write cache 104 and directory 122 of FIG. 1 according to the present invention is shown. FIG. 6 illustrates only one write cache 104 and one directory 122, although as shown in FIGS. 1 and 5, each RAID controller 102 includes two write caches 104 and two directories 122.

The write cache 104 is configured as an array of write cache buffers 604 and the directory 122 is configured as an array of directory entries 602. Each write cache buffer 604 has an array index. The write cache 104 array indices are denoted 0 through N. Each directory entry 602 has an array index. The directory 122 array indices are denoted 0 through N, corresponding to the write cache 104 array indices.

As shown in FIG. 6, the value in the write cache base address register 234 points to the beginning of the write cache 104, i.e., to the memory address of the first byte of the write cache buffer 604 at index 0. Additionally, the value in the directory base address register 232 points to the beginning of the directory 122, i.e., to memory address of the first byte of the directory entry 602 at index 0. In one embodiment, the value stored in the write cache base address register 234 must be an integer multiple of the size of a write cache buffer 604 and the value stored in the directory base address register 232 must be an integer multiple of the size of a directory entry 602. In the embodiment of FIG. 6, the size of a write cache buffer 104 is 16 KB, which enables a write cache buffer 104 to store the data for 32 disk sectors (each disk sector being 512 bytes); therefore, the value stored in the write cache base address register 234 is aligned on a 16 KB boundary. In the embodiment of FIG. 6, the size of a directory entry 602 is 32 bytes; therefore, the value stored in the directory base address register 232 is aligned on a 32 byte boundary.

In the embodiment of FIG. 6, each directory entry 602 includes a start LBA field 612 that is eight bytes, a valid bits field 614 that is four bytes, a disk array serial number field 616 that is eight bytes, and a reserved field 618 that is twelve bytes. The reserved field 618 is used make the size of a directory entry 602 a power of two to simplify the logic in the bus bridge 124 for calculating the address of the valid bits 614 as described below. The disk array serial number field 616 stores a serial number uniquely identifing the disk array 116 to which the data in the write cache buffer 604 is to be written. The start LBA field 612 contains the disk array 116 logical block address of the first valid sector of the corresponding write cache buffer 604. There are 32 valid bits in the valid bits field 614: one bit corresponding to each of the 32 sectors in the respective write cache buffer 604. If the valid bit is set for a sector, then the data in the sector of the write cache buffer 604 is valid, or dirty, and needs to be flushed to the disk array 116 by the RAID controller 102 that is failed over to in the event of a failure of the other RAID controller 102. If the valid bit is clear for a sector, then the data in the sector of the write cache buffer 604 is invalid, or clean.

When the bus bridge 124 receives a PCI-Express TLP memory write request whose Address field specifies a destination in its broadcast address range, the control logic 214 of the bus bridge 124 computes the index for the appropriate write cache buffer 604 and directory entry 602 and the memory address of the valid bits in the directory entry 602 according to equations 1 and 2 below.

$$\text{index} = (\text{TLP Address} - \text{write cache base address})/\text{size of cache buffer} \quad \text{(Eq. 1)}$$

$$\text{valid bits address} = \text{directory base address} + (\text{index} * \text{size of directory entry}) + 8 \quad \text{(Eq. 2)}$$

Calculating the valid bits address enables the bus bridge 124 to automatically clear the valid bits 614 in the directory entry 602 as described below with respect to FIGS. 7 and 8.

In an alternate embodiment, the directory 122 comprises two distinct arrays of entries. The first array of entries include only the valid bits 614 and the second array includes the start LBA 612 and disk array serial number 616. In this embodiment, the directory base address register 232 stores the base address of the valid bits array. This embodiment eliminates the requirement to add the offset of the valid bits 614 within the directory entry 602 when calculating the valid bit address and may also eliminate the need for the reserved field 618 to save space. In another embodiment, the valid bits 614 comprise the first field of the directory entry 602, which also eliminates the requirement to add the offset of the valid bits 614 within the directory entry 602 when calculating the valid bit address. Although multiple embodiments of the configuration of the directory 122 are described, the present invention is not limited to a particular configuration. What is important is that the bus bridge 124 has the information necessary to determine the location of the valid bits 614 in order to automatically invalidate write cache buffers 104 implicated by a PCI-Express memory write request TLP received on the PCI-Express link 118.

Figure 7:
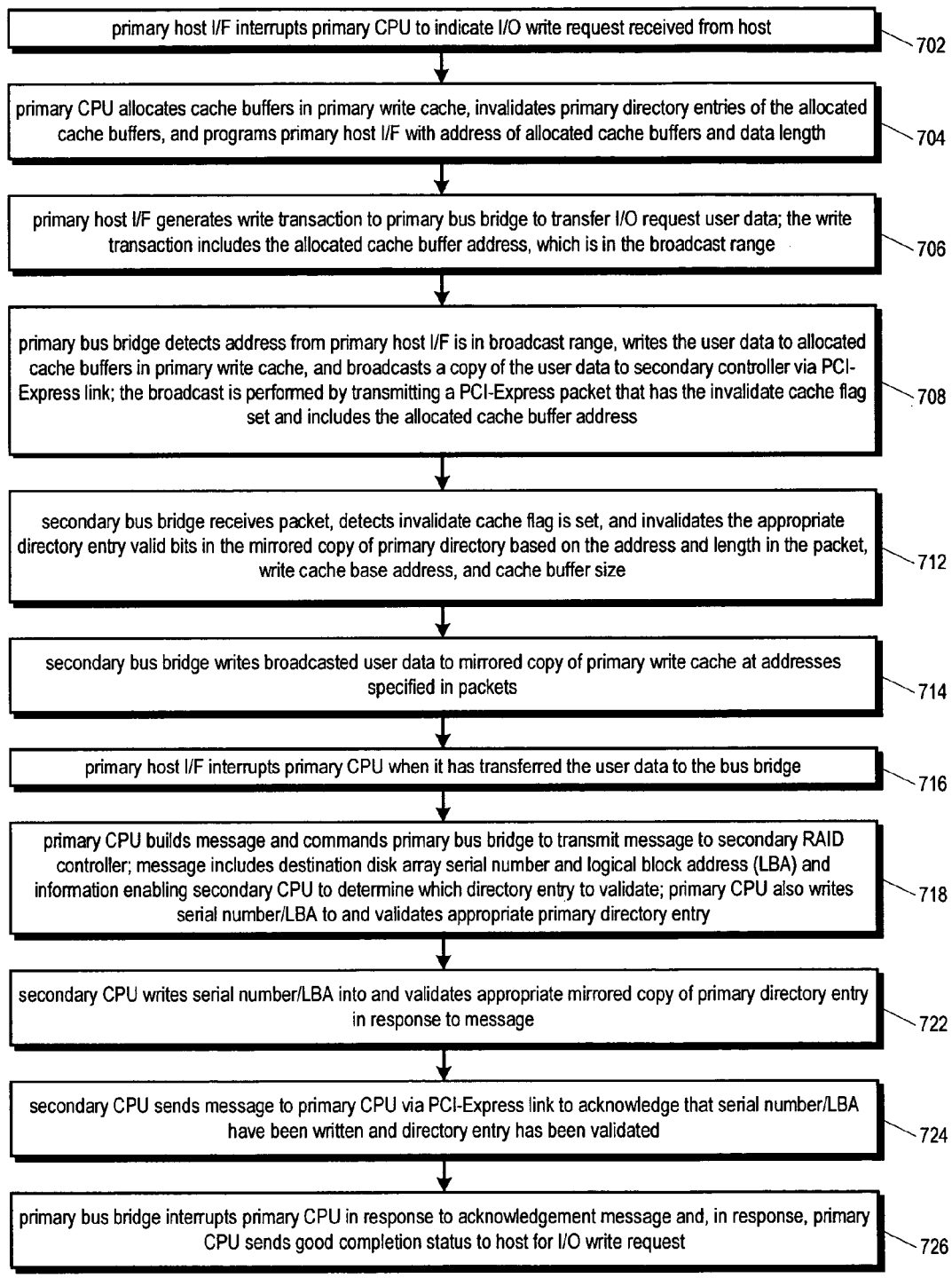
FIG. 7 is a flowchart illustrating operation of the system to perform a mirrored posted-write operation according to one embodiment of the present invention.

Referring now to FIG. 7, a flowchart illustrating operation of the system 100 to perform a mirrored posted-write operation according to one embodiment of the present invention is shown. Flow begins at block 702.

At block 702, the primary host interface 126A receives an I/O request from the host computer 114 and interrupts the primary CPU 108A to notify it of receipt of the I/O request. Flow proceeds to block 704.

At block 704, in response to the interrupt, the primary CPU 108A examines the I/O request and determines the I/O request is a write request. The flowchart of FIG. 7 assumes that write-posting is enabled on the RAID controllers 102. In response, the primary CPU 108A allocates a write cache buffer 604 in the primary write cache 104A-1 and invalidates the allocated write cache buffer 604 by clearing the appropriate valid bits 614 in the corresponding directory entry 602 in the primary directory 122A-1. The primary CPU 108A also writes the destination primary disk array 116A serial number and logical block address to the directory entry 602 after clearing the valid bits 614. The primary CPU 108A subsequently programs the primary host interface 126A with the memory address of the allocated write cache buffer 604 and length of the data to be written to the write cache buffer 604, which is specified in the I/O write request. In one embodiment, if the amount of data specified in the I/O write request is larger than a single write cache buffer 604 and sufficient physically contiguous write cache buffers 604 are not available, the primary CPU 108A allocates multiple write cache buffers 604 and provides to the primary host interface 126A a scatter/gather list of write cache buffer 604 address/length pairs. Flow proceeds to block 706.

At block 706, the primary host interface 126A generates a write transaction, such as a PCI-X memory write transaction, on the bus coupling the primary host interface 126A to the primary bus bridge 124A to write the user data specified in the I/O request. The write transaction includes the memory address of the write cache buffer 604 allocated at block 704. The memory address is in the primary broadcast address range shown in FIG. 5. Flow proceeds to block 708.

At block 708, the primary bus bridge 124A writes the data specified in the write transaction to the address in the primary write cache 104A-1 specified by the write transaction, namely the address of the write cache buffer 604 allocated at block 704. Additionally, the primary bus bridge 124A detects that the write transaction address is in the primary broadcast address range and broadcasts a copy of the user data to the secondary bus bridge 124B via the PCI-Express link 118. The primary bus bridge 124A performs the broadcast by transmitting a PCI-Express memory write request TLP having a TLP header 400 of FIG. 4. The Address field of the TLP header 400 includes the memory address specified in the memory write transaction generated by the primary host interface 126A and the Length field of the TLP header 400 includes the length specified in the memory write transaction generated by the primary host interface 126A. In the embodiment of FIG. 7, the primary bus bridge 124A sets the invalidate cache flag 402 in each of the PCI-Express memory write request TLPs. In one embodiment, if the length of the user data specified in the I/O request is greater than 2 KB, the primary host interface 126A breaks up the data transfer to the primary bus bridge 124A into multiple write transactions each 2KB or smaller; consequently, the primary bus bridge 124A transmits multiple PCI-Express memory write request TLPs each including 2 KB or less of user data. In this embodiment, the host interface 126 includes 2 KB internal FIFO buffers that buffer the user data received from the host computer 114 for transferring to the write cache 104 via the bus bridge 124. The bus bridge 124 FIFO buffers 206 of FIG. 2 also comprises 2 KB buffers for buffering the user data received from the host interface 126. Furthermore, the bus bridge 124 includes an arbiter, such as a PCI-X arbiter that performs arbitration on the PCI-X bus coupling the host interface 126 to the bus bridge 124. The arbiter is configured to allow the host interface 126 to always generate PCI-X write transactions to the bus bridge 124 on the PCI-X bus that are atomic, that are a minimum of a sector in size (i.e., 512 bytes), and that are a multiple of a sector size. Flow proceeds to block 712.

At block 712, the secondary bus bridge 124B receives the TLP transmitted by the primary bus bridge 124A, detects the invalidate cache flag 402 is set, and in response invalidates (i.e., clears) the appropriate valid bits 614 in the appropriate directory entry 602 of the mirrored copy of the primary directory 122B-2. The appropriate directory entry 602 is the directory entry 602 whose index equals the write cache buffer 604 in the mirrored copy of the primary write cache 104B-2 implicated by the TLP header 400 Address. The index is calculated according to Equation 1 above, and the memory address of the valid bits 614 is calculated according to Equation 2 above. Assuming bit 0 is the bit corresponding to sector 0 in the write cache buffer 604 and bit 31 is the bit corresponding to sector 31 in the write cache buffer 604, the control logic 214 of the secondary bus bridge 124B determines the first bit and number of bits in the valid bits 614 to clear according to Equations 3 and 4 below, and which are also shown in FIG. 6.

first bit=(TLP Address modulo size of write cache buffer)/size of sector (Eq. 3)

number of bits=TLP Length/size of sector (Eq. 4)

Because the secondary bus bridge 124B may need to clear less than all of the valid bits 614 in the directory entry 602, the secondary bus bridge 124B performs a read/modify/write operation to clear the appropriate valid bits 614. In one embodiment, to avoid the secondary bus bridge 124B performing a read/modify/write operation to clear the appropriate valid bits 614, the bus bridge 124 caches the valid bits 614. In another embodiment, the bus bridge 124 looks ahead at other TLPs in its FIFOs 206 and if it finds contiguous TLPs that specify all 32 sectors of a directory entry 602, then the bus bridge 124 clears all 32 valid bits 614 in a single write, rather than performing a series of read/modify/write operations to clear the valid bits 614 in a piecemeal fashion. Flow proceeds to block 714.

At block 714, the secondary bus bridge 124B writes the user data from the TLP payload to the secondary cache memory 144B address specified in the TLP header 400 Address, which is the address of the destination write cache buffer 604 in the mirrored copy of the secondary write cache 104A-2. The destination write cache buffer 604 in the mirrored copy of the secondary write cache 104A-2 is the mirrored counterpart of the write cache buffer 104 allocated in the primary write cache 104A-1 at block 704. Flow proceeds to block 716.

At block 716, the primary host interface 126A interrupts the primary CPU 108A once the primary host interface 126A has finished transferring all of the user data to the primary bus bridge 124A. Flow proceeds to block 718.

At block 718, in response to the interrupt, the primary CPU 108A builds a message and commands the primary bus bridge 124A to transmit the message to the secondary CPU 108B to instruct the secondary CPU 108B to validate the write cache buffer 604 since the user data has been successfully written thereto. The message includes information that enables the secondary CPU 108B to validate (i.e., set) the appropriate valid bits 614 in the appropriate directory entry 602 of the mirrored copy of the primary directory 122B-2. For example, the information may include the scatter/gather list of address/length pairs provided to the host interface 126 at block 704, which enables the secondary CPU 108B to determine and validate the appropriate valid bits 614 in the appropriate directory entry 602 of the mirrored copy of the primary directory 122B-2. Additionally, the message includes the serial number and logical block address (LBA) of the disk array 116 to which the user data is to be written. Additionally, the primary CPU 108A writes the serial number and LBA to the directory entry 602 of the primary directory 122A-1 and then sets the valid bits 614 corresponding to the sectors written at block 708, which are also the valid bits 614 cleared at block 704. In one embodiment, the secondary CPU 108B also updates a mirror hash table in response to the message based on the disk array 116 serial number and LBA. The mirror hash table is used to avoid duplicate valid entries 602 in the directories 122 for the same logical block address on a disk array 116, which could otherwise occur because write cache buffers 604 are not invalidated until just prior to their next use. In one embodiment, the message is transmitted via the method described in the above-referenced U.S. patent application Ser. No. 11/178,727 (CHAP.0125). In one embodiment, the bus bridge 124 is configured such that the transmission of the message is guaranteed to flush the user data written at block 714. Flow proceeds to block 722.

At block 722, in response to the message sent at block 718, the secondary CPU 108B writes the serial number and LBA to the directory entry 602 in the mirrored copy of the primary directory 122B-2 and then sets the valid bits 614 corresponding to the sectors written at block 714, which are also the valid bits 614 cleared at block 712. Flow proceeds to block 724.

At block 724, the secondary CPU 108B sends a message to the primary CPU 108A to acknowledge that the message received at block 722 has been performed. Flow proceeds to block 726.

At block 726, the primary bus bridge 124A interrupts the primary CPU 108A in response to the acknowledgement message, and the primary CPU 108A responsively commands the primary host interface 126A to send good completion status to the host computer 114 for the I/O write request. Flow ends at block 726.

Figure 8:
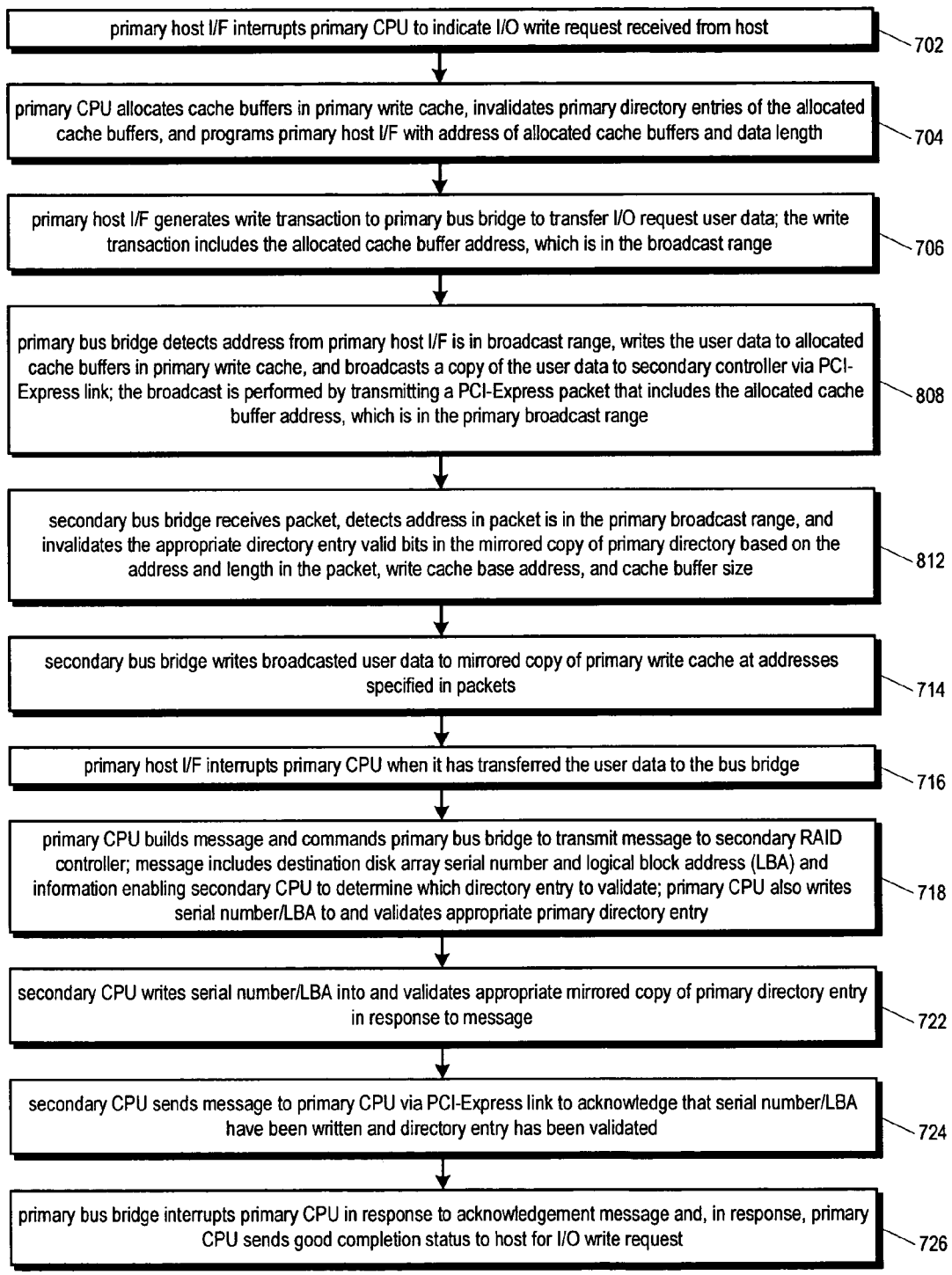
FIG. 8 is a flowchart illustrating operation of the system to perform a mirrored posted-write operation according to an alternate embodiment of the present invention.

Referring now to FIG. 8, a flowchart illustrating operation of the system 100 to perform a mirrored posted-write operation according to an alternate embodiment of the present invention is shown. The flowchart of FIG. 8 describes a mirrored posted-write operation similar to the mirrored posted-write operation described in the flowchart of FIG. 7; therefore, like blocks are identically numbered. However, the operation described in FIG. 8 does not employ the modified PCI-Express TLP header 400 of FIG. 4, but instead may employ the PCI-Express TLP header 300 of FIG. 3. In particular, block 708 is replaced by block 808 in FIG. 8 in which the primary bus bridge 124A does not set the invalidate cache flag 402. Furthermore, block 712 is replaced by block 812 in FIG. 8 in which the secondary bus bridge 124B, rather than detecting the invalidate cache flag 402 is set, detects that it must first invalidate the directory entry 602 by detecting that the Address specified in the TLP header 300 is within the primary broadcast address range. The embodiment of FIG. 8 has the advantage over the embodiment of FIG. 7 that the entire 64-bit Address field may be employed; however, the embodiment of FIG. 8 has the disadvantage that the secondary bus bridge 124B, rather than testing a single bit, must determine whether the memory address is within a range of addresses.

Although the present invention and its objects, features, and advantages have been described in detail, other embodiments are encompassed by the invention. For example, although embodiments have been described in which the bus bridge described herein is employed to automatically invalidate cache buffers in order to offload the RAID controller CPUs from invalidating the cache buffers, the bus bridge described herein could also be used to offload other actions from the CPUs. For example, an embodiment is contemplated in which each cache buffer's directory entry includes a sequence number, and the bus bridge writes a unique cache sequence number into the directory entry when it clears the valid bits and prior to writing the user data into the write cache buffer in response to reception of a memory write request TLP in the write cache buffer range. In addition, although embodiments have been described in which the communications link between the RAID controllers is a PCI-Express link, other load-store architecture communications links may be employed, such as local buses, e.g., PCI, PCI-X, or other PCI family buses, capable of performing memory write transactions that include a memory address and length specifying the mirrored user data to be written to the partner RAID controller write cache. Furthermore, although an embodiment has been described in which an address bit in a PCI-Express TLP header is used as an invalidate cache flag, other bits in other fields of the header may be employed. Furthermore, in embodiments employing load-store architecture communications links other than PCI-Express, other unused bits of the local bus may be employed as an invalidate cache flag, such as upper address bits or reserved bits. Finally, although various calculations are described by which the bus bridge determines the address of directory entry valid bits and which valid bits to invalidate, the invention is not limited to the particular calculations described, but may be adapted according to other configurations of the write cache buffers and directories. Additionally, the bus bridge circuitry may perform the calculations in any manner as needed, for example, the calculation need not be performed as a two-step process that calculates the index intermediately, but may integrate the calculation into a single step process.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for performing a mirrored posted-write operation in a system having first and second redundant array of inexpensive disks (RAID) controllers in communication via a high-speed communications link, each of the RAID controllers having a CPU, a cache memory, and a bus bridge that bridges the CPU, cache memory, and communications link, the cache memory having first and second sets of write cache buffers, and corresponding valid indicators for indicating whether each of the write cache buffers of the second set contains valid data to be flushed to a disk array by the RAID controller if the other RAID controller fails, the method comprising:

receiving, by the bus bridge of the first RAID controller, data transmitted to the first RAID controller by a host computer;

writing, by the bus bridge of the first RAID controller, the data to one or more of the first set of write cache buffers of the first RAID controller, in response to said bus bridge of the first RAID controller receiving the data transmitted by the host computer;

broadcasting, by the bus bridge of the first RAID controller, a copy of the data to the bus bridge of the second RAID controller via the link, in response to said bus bridge of the first RAID controller receiving the data transmitted by the host computer;

receiving, by the bus bridge of the second RAID controller, the copy of the data via the communications link;

writing, by the bus bridge of the second RAID controller, the copy of the data to one or more of the second set of write cache buffers of the second RAID controller, in response to said receiving the copy of the data; and updating one or more of the corresponding valid indicators of the second RAID controller to indicate that said one or more of the second set of write cache buffers of the second RAID controller does not contain valid data, wherein said updating the valid indicators is performed automatically by the bus bridge of the second RAID controller in response to said receiving the copy of the data, wherein the bus bridge of the second RAID controller automatically performs the updating of the valid indicators prior to said writing the copy of the data, wherein the CPU of the second RAID controller is alleviated from updating the valid indicators because the bus bridge of the second RAID controller automatically updates the valid indicators.

2. The method of claim 1, wherein said broadcasting comprises the bus bridge of the first RAID controller transmitting to the bus bridge of the second RAID controller an address specifying a location of the one or more write cache buffers in the cache memory of the second RAID controller, wherein the bus bridge of the second RAID controller performs said automatically updating only if the address is within an address range programmed into the bus bridge of the second RAID controller by the CPU of the second RAID controller, wherein an array of cache buffers including said one or more cache buffers of the second write cache occupy said address range.

3. The method of claim 1, wherein said broadcasting by the bus bridge of the first RAID controller includes providing an indication to the bus bridge of the second RAID controller to invalidate the one or more cache buffers prior to said writing the copy of the data.

4. The method of claim 3, wherein the indication to invalidate the one or more cache buffers is comprised within a PCI-Express transaction layer packet (TLP) containing the copy of the data.

5. The method of claim 4, wherein the indication comprises a predetermined value in a predetermined address bit of the address field of the TLP header interpreted by the second bus bridge as the invalidate indication rather than as an address bit.

6. The method of claim 1, wherein said broadcasting comprises the bus bridge of the first RAID controller transmitting to the bus bridge of the second RAID controller a buffer address specifying a location of the one or more cache buffers in the cache memory of the second RAID controller, wherein said bus bridge of the second RAID controller writing the copy of the data comprises said bus bridge of the second RAID controller writing the copy of the data to the cache memory of the second RAID controller at the buffer address.

7. The method of claim 6, wherein the buffer address is specified in a PCI-Express transaction layer packet (TLP) header address field.

8. The method of claim 6, further comprising:

determining, by the bus bridge of the second RAID controller, a location of one or more valid indicators of the second RAID controller for indicating whether the one or more cache buffers of the cache memory of the second RAID controller are valid, in response to said receiving the copy of the data, wherein the bus bridge of the second RAID controller determines the location based on the buffer address and a base address specifying a starting location of an array of cache buffers of the cache memory of the second RAID controller including the one or more cache buffers.

9. The method of claim 8, further comprising:

storing the base address into a register of the bus bridge of the second RAID controller, prior to said receiving the copy of the data.

10. The method of claim 9, wherein said storing the base address into a register of the second bus bridge comprises the CPU of the second RAID controller storing the base address into the register during initialization of the second RAID controller.

11. The method of claim 8, wherein said bus bridge of the second RAID controller determining the location of the one or more valid indicators comprises generating an index value by subtracting the base address from the buffer address and then dividing a result of said subtracting by a predetermined size of each of the cache buffers of the array.

12. The method of claim 11, wherein said bus bridge of the second RAID controller determining the location of the one or more valid indicators further comprises multiplying the index by a predetermined size of a data structure containing the valid indicators and adding a result of said multiplying to a second base address specifying a starting location of an array of valid indicators including the one or more valid indicators.

13. The method of claim 12, further comprising:

storing the second base address into a second register of the bus bridge of the second RAID controller, prior to said receiving.

14. The method of claim 13, wherein said storing the second base address into a second register of the bus bridge of the second RAID controller comprises the CPU of the second RAID controller storing the second base address into the second register during initialization of the second RAID controller.

15. The method of claim 1, wherein said broadcasting comprises the bus bridge of the first RAID controller transmitting to the bus bridge of the second RAID controller a length of the copy of the data.

16. The method of claim 1, wherein the high-speed communications link comprises a PCI-Express link.

17. The method of claim 1, wherein said bus bridge of the first RAID controller receiving data transmitted by a host computer comprises the bus bridge of the first RAID controller receiving the data from a host interface controller preceded by an address specifying a destination of the data in the cache memory of the first and second RAID controllers.

18. The method of claim 1, wherein the second RAID controller further includes one or more valid indicators for indicating whether the one or more cache buffers of the cache memory of the second RAID controller are valid, wherein said automatically updating comprises clearing the one or more valid indicators.

19. The method of claim 1, further comprising:
  validating, by the CPU of the second RAID controller, the one or more cache buffers, after said bus bridge of the second RAID controller writing the copy of the data.

20. The method of claim 19, further comprising:
  writing, by the CPU of the second RAID controller, into a directory of the second RAID controller, a logical block address of a disk array to which the copy of the data is to be written by the second RAID controller if the first RAID controller fails, prior to said second CPU validating the one or more cache buffers.

21. A bus bridge on a first redundant array of inexpensive disks (RAID) controller, the bus bridge comprising:
  a memory interface, coupled to a cache memory of the first RAID controller, wherein said cache memory includes a plurality of write cache buffers and a directory thereof, said directory including valid indicators for indicating whether each of said plurality of write cache buffers contains valid data to be flushed to a disk array by the first RAID controller if a second RAID controller in communication therewith fails;
  a first local bus interface, configured to enable a CPU of the first RAID controller to access said cache memory;
  a second local bus interface, for coupling the first RAID controller to said second RAID controller via a second local bus, configured to receive mirrored write-cache data broadcasted from said second RAID controller on said local bus; and
  control logic, coupled to said memory interface and said second local bus interface, configured to automatically control said memory interface to write said mirrored write-cache data to one of said plurality of write cache buffers, and to update said valid indicators to indicate said one of said plurality of write cache buffers does not contain valid data prior to writing said mirrored write-cache data, in response to receiving said mirrored write-cache data, wherein said CPU is alleviated from updating said valid indicators because said control logic automatically controls said memory interface to update said valid indicators.

22. The bus bridge of claim 21, wherein said second local bus comprises a PCI-Express link.

23. The bus bridge of claim 21, wherein said first local bus comprises a PCI-X bus.

24. The bus bridge of claim 21, further comprising:
  a first-in-first-out (FIFO) memory, coupling said memory interface and said second local bus interface, for buffering said mirrored write-cache data.

25. The bus bridge of claim 21,
  wherein said control logic is configured to selectively cause said memory interface to update said valid indicators.

26. The bus bridge of claim 25, wherein said second local bus interface is configured to receive said mirrored write-cache data in a transaction on said second local bus that includes an invalidate cache indicator, wherein said control logic automatically controls said memory interface to update said valid indicators only if said invalidate cache indicator indicates to update said valid indicators.

27. The bus bridge of claim 26, wherein said transaction comprises a PCI-Express memory write request transaction layer packet (TLP), wherein said control logic automatically controls said memory interface to update said valid indicators only if said TLP indicates to update said valid indicators.

28. The bus bridge of claim 27, wherein said TLP indicates to update said valid indicators if a predetermined address bit of the address field of the TLP header has a predetermined value, wherein said control logic interprets said predetermined address bit as an invalidate indicator rather than as an address bit.

29. The bus bridge of claim 25, wherein said control logic is configured to store an address range, wherein said second local bus interface is configured to receive said mirrored write-cache data in a transaction on said second local bus that includes a memory address of said one of said plurality of write cache buffers, wherein said control logic automatically controls said memory interface to update said valid indicators only if said memory address is within said address range.

30. The bus bridge of claim 21,
  wherein said control logic is configured to calculate an address of said valid indicators based on an address of said one of said plurality of write cache buffers.

31. The bus bridge of claim 30, wherein said address of said one of said plurality of write cache buffers is received from said second RAID controller on said local bus by said second local bus interface along with said mirrored write-cache data.

32. The bus bridge of claim 30, wherein said control logic calculating said address of said valid indicators comprises subtracting said address of said one of said plurality of write cache buffers from a base address of said plurality of write cache buffers and dividing by a predetermined size of one of said plurality of write cache buffers to generate a quotient.

33. The bus bridge of claim 32, further comprising:
  a register, programmable by said CPU, configured to store said base address of said plurality of write cache buffers.

34. The bus bridge of claim 32, wherein said calculating said address of said valid indicators further comprises multiplying said quotient by a predetermined size of an entry in said directory to generate a product, wherein said directory entry includes said valid indicators.

35. The bus bridge of claim 34, wherein said calculating said address of said valid indicators further comprises adding said product to a base address of said directory to generate a sum.

36. The bus bridge of claim 35, further comprising:
  a register, programmable by said CPU, configured to store said base address of said directory.

37. The bus bridge of claim 35, wherein said calculating said address of said valid indicators further comprises adding said sum to an offset of said valid indicators within said directory entry.

38. The bus bridge of claim 37, wherein said directory entry comprises a vector of valid bits comprising said valid indicators, wherein a first of said valid bits updated by said memory interface to indicate said one of said plurality of write cache buffers does not contain valid data is calculated by taking said address of said one of said plurality of write cache buffers modulo said predetermined size of one of said plurality of write cache buffers and then dividing by a predetermined size of a disk sector.

39. The bus bridge of claim 38, wherein a number of said valid bits updated by said memory interface to indicate said one of said plurality of write cache buffers does not contain valid data is calculated by dividing a length of said mirrored write-cache data by said predetermined size of a disk sector.

40. The bus bridge of claim 21, further comprising:
  a third local bus interface, for coupling to a disk interface for flushing said plurality of write cache buffers containing valid data to said disk array.

41. A system for performing a mirrored posted-write operation, comprising:

two redundant array of inexpensive disks (RAID) controllers in communication via a communications link, each of said RAID controllers comprising a CPU, a write cache, and a bus bridge coupled to said CPU, said write cache, and said communications link;

wherein each said bus bridge is configured to receive data transmitted to its respective RAID controller by a host computer and, in response, to write said data to its respective write cache and to broadcast a copy of said data to the other bus bridge via said link;

wherein the other bus bridge is configured to, in response to receiving said copy of said data from said link, write said copy of said data to a cache buffer of its respective write cache, and to automatically invalidate said cache buffer prior to writing said copy of said data, wherein each of said respective CPUs is alleviated from invalidating said cache buffer because said bus bridge automatically invalidates said cache buffer in response to receiving said copy of said data from said link.

42. The system of claim 41, wherein each of said RAID controllers is coupled to first and second disk arrays, wherein a first of said RAID controllers is configured to control said first disk array during normal operation and a second of said RAID controllers is configured to control said second disk array during normal operation, wherein said first RAID controller write cache comprises a first portion for caching data to be written to said first disk array and said second RAID controller write cache comprises a first portion for caching data to be written to said second disk array, wherein said first RAID controller write cache comprises a second portion for caching a mirrored copy of said first portion of said second RAID controller write cache and said second RAID controller write cache comprises a second portion for caching a mirrored copy of said first portion of said first RAID controller write cache.

43. The system of claim 42, wherein each of said CPUs is configured to send a message to the other CPU to validate said cache buffer after the other bus bridge writes said copy of said data to said cache buffer.

44. The system of claim 43, wherein said message includes a logical block address of said respective disk array to which said data is to be written, wherein the other CPU writes said logical block address to said write cache prior to the other CPU validating said cache buffer.

45. The system of claim 44, wherein said message includes an identifier identifying said respective disk array to which said data is to be written, wherein the other CPU writes said identifier to said write cache prior to the other CPU validating said cache buffer.

46. The system of claim 43, wherein if said first RAID controller fails, said second RAID controller is configured to flush all valid cache buffers in said second portion of its write cache to said second disk array, wherein if said second RAID controller fails, said first RAID controller is configured to flush all valid cache buffers in said second portion of its write cache to said first disk array.

47. The system of claim 41, wherein each of said RAID controllers further comprises a host interface, coupled to said bus bridge, configured to receive said data from said host computer and to generate a transaction to said bus bridge to write said data to its respective write cache.

48. The system of claim 47, wherein said transaction comprises an address of a destination of said data in said RAID controller write cache, wherein said address also specifies said cache buffer in the other RAID controller write cache to which said copy of said data is written.

49. The system of claim 48, wherein said bus bridge broadcasts said copy of said data to the other bus bridge via said link only if said address is within an address range programmed into said bus bridge.

50. The system of claim 49, wherein if said address is within said address range programmed into said bus bridge, said bus bridge broadcasts an invalidate indicator along with said copy of said data to the other bus bridge via said link.

51. The system of claim 50, wherein said invalidate indicator comprises a predetermined value in a predetermined address bit of the address field of a PCI-Express memory write request transaction layer packet header, wherein said other bus bridge interprets said predetermined address bit as an invalidate indicator rather than as an address bit.

52. The system of claim 48, wherein the other bus bridge invalidates said cache buffer only if said address is within an address range programmed into the other bus bridge.

53. The system of claim 41, wherein said communications link comprises a PCI-Express link.

* * * * *

UNITED STATES PATENT AND TRADEMARK OFFICE
CERTIFICATE OF CORRECTION

PATENT NO. : 7,340,555 B2
APPLICATION NO. : 11/272340
DATED : March 4, 2008
INVENTOR(S) : Paul Andrew Ashmore and Ian Robert Davies It is certified that error appears in the above-identified patent and that said Letters Patent is hereby corrected as shown below:

Title Page
Please correct the Related U.S. Application Data on the cover of the patent. It should read as follows:
(63) Continuation-in-part of application No. 11/178,727, filed on Jul. 11, 2005, now Pat. No. 7,143,227, and a continuation-in-part of application No. 10/368,688, filed on Feb. 18, 2003, now Pat. No. 7,143,277, and a continuation-in-part of
application No. 10/946,341, filed on Sep. 21, 2004, now Pat. No. 7,146,448, which is a continuation-in-part of application No. 09/967,027, filed on Sep. 28, 2001, now Pat. No. 6,839,788.

Signed and Sealed this

Tenth Day of February, 2009

JOHN DOLL
*Acting Director of the United States Patent and Trademark Office*